US007802926B2

(12) United States Patent
Leeman et al.

(10) Patent No.: US 7,802,926 B2
(45) Date of Patent: Sep. 28, 2010

(54) OPTICAL FIBRE CONNECTION DEVICE

(75) Inventors: Sam Leeman, Kessel-Lo (BE); Erik Peeters, Heverlee (BE); Erwin Junius, Tremelo (BE); Sandra Goossens, Bost-Tienen (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 0 days.

(21) Appl. No.: 12/088,101

(22) PCT Filed: Oct. 2, 2006

(86) PCT No.: PCT/EP2006/066949

§ 371 (c)(1),
(2), (4) Date: Mar. 26, 2008

(87) PCT Pub. No.: WO2007/039585

PCT Pub. Date: Apr. 12, 2007

(65) Prior Publication Data

US 2008/0240658 A1    Oct. 2, 2008

(30) Foreign Application Priority Data

Oct. 5, 2005 (GB) ................................ 0520166.0
Jun. 2, 2006 (GB) ................................ 0610877.3

(51) Int. Cl.
*G02B 6/36* (2006.01)
(52) U.S. Cl. ........................................ 385/86; 385/137
(58) Field of Classification Search .................... 385/86, 385/137
See application file for complete search history.

(56) References Cited

U.S. PATENT DOCUMENTS 4,274,708 A * 6/1981 Cocito et al. .................. 385/95

(Continued)

FOREIGN PATENT DOCUMENTS

EP        0913883 A1    5/1999

(Continued)

OTHER PUBLICATIONS

International Search Report for PCT/EP2006/066949 issued by the International Search Authority/EPO on Mar. 5, 2007.

*Primary Examiner*—Jerry T Rahll
(74) *Attorney, Agent, or Firm*—Baker & Daniels LLP

(57) ABSTRACT

The present invention provides an optical fiber connection device comprising a part (103) of a screw-threadless multi-part (101, 103) optical fiber cable connector (100), the multi-parts (101, 103) of the connector (100) being inter-connectable, the part (103) comprising a body (102), the body (102) comprising: an optical fiber cable connection end (105) for connection with an optical fiber cable (106); a part connection end (104) for connection with another part (101) of the multi-part optical fiber cable connector (100); and one or more formations (113) adapted to co-operate with a retainer (213, 313) in a mounting (200, 300) for the connector (100), the mounting (200, 300) used to retain the optical fiber cable (106) and the connector (100) when the optical fiber cable (106) is connected to the optical fiber cable connection end (105) of the body (102), the formations (113) adapted to co-operate with the mounting retainer (213, 313) to resist rotational and/or axial movement of the connector (100) when the connector (100) is assembled with an optical fiber cable (106) and the other parts (103, 101) of the connector (100) and mounted in the mounting (200, 300).

27 Claims, 24 Drawing Sheets

U.S. PATENT DOCUMENTS

| | | | |
|---|---|---|---|
| 4,986,762 A * | 1/1991 | Keith | 439/131 |
| 5,402,515 A * | 3/1995 | Vidacovich et al. | 385/135 |
| 5,938,181 A | 8/1999 | Holden | |
| 6,266,469 B1 | 7/2001 | Roth | |
| 6,396,993 B1 | 5/2002 | Giebel et al. | |
| 6,543,941 B1 * | 4/2003 | Lampert | 385/58 |
| 6,579,014 B2 | 6/2003 | Melton et al. | |
| 6,648,520 B2 | 11/2003 | McDonald et al. | |

FOREIGN PATENT DOCUMENTS

| | | |
|---|---|---|
| EP | 1394585 A1 | 8/2003 |
| WO | 97/42531 A1 | 11/1997 |
| WO | 99/42881 A1 | 8/1999 |
| WO | 2004/107002 A1 | 12/2004 |
| WO | 2005/073767 A1 | 8/2005 |

* cited by examiner

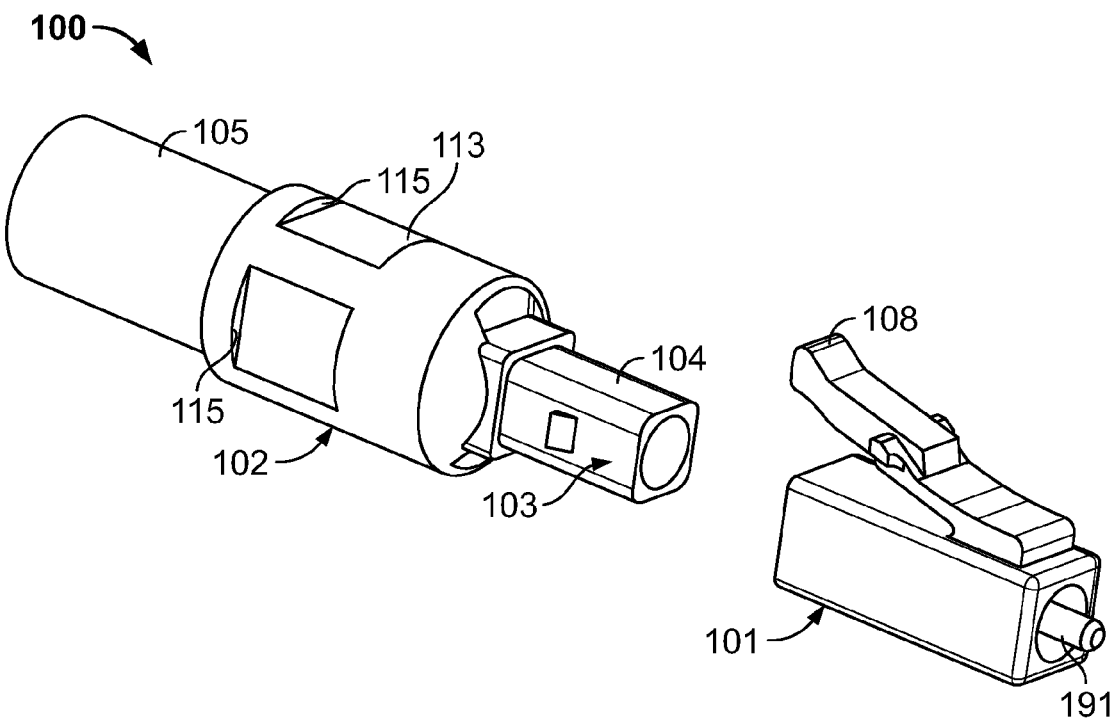
FIG. I-1
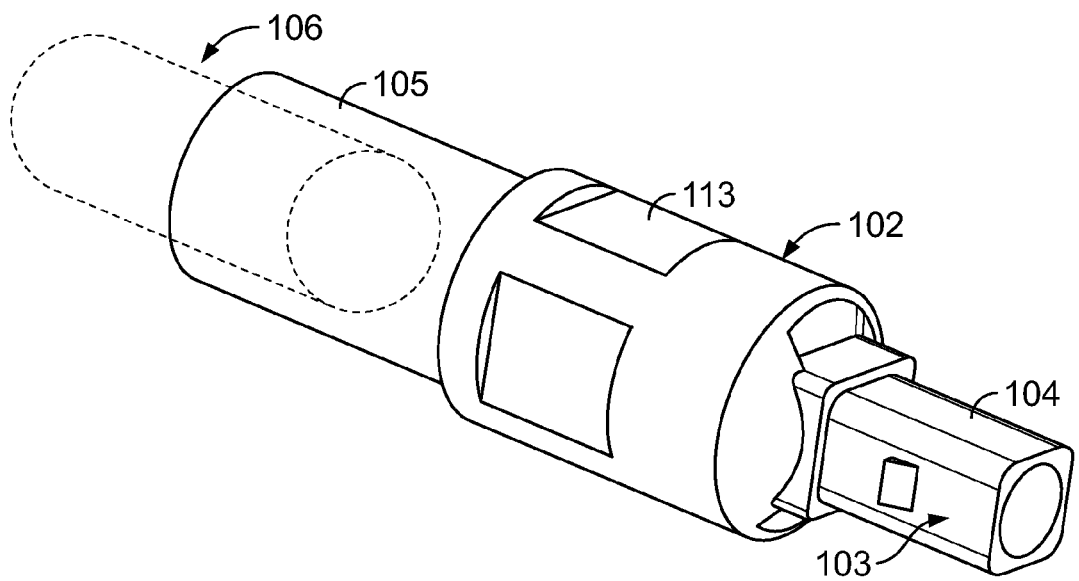
FIG. I-3

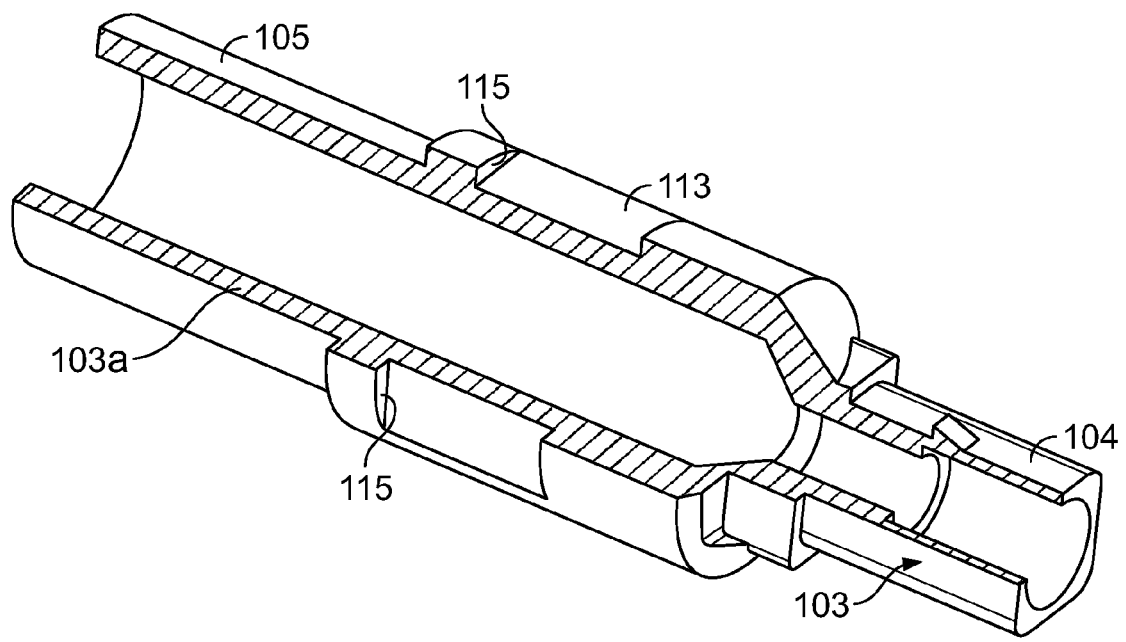
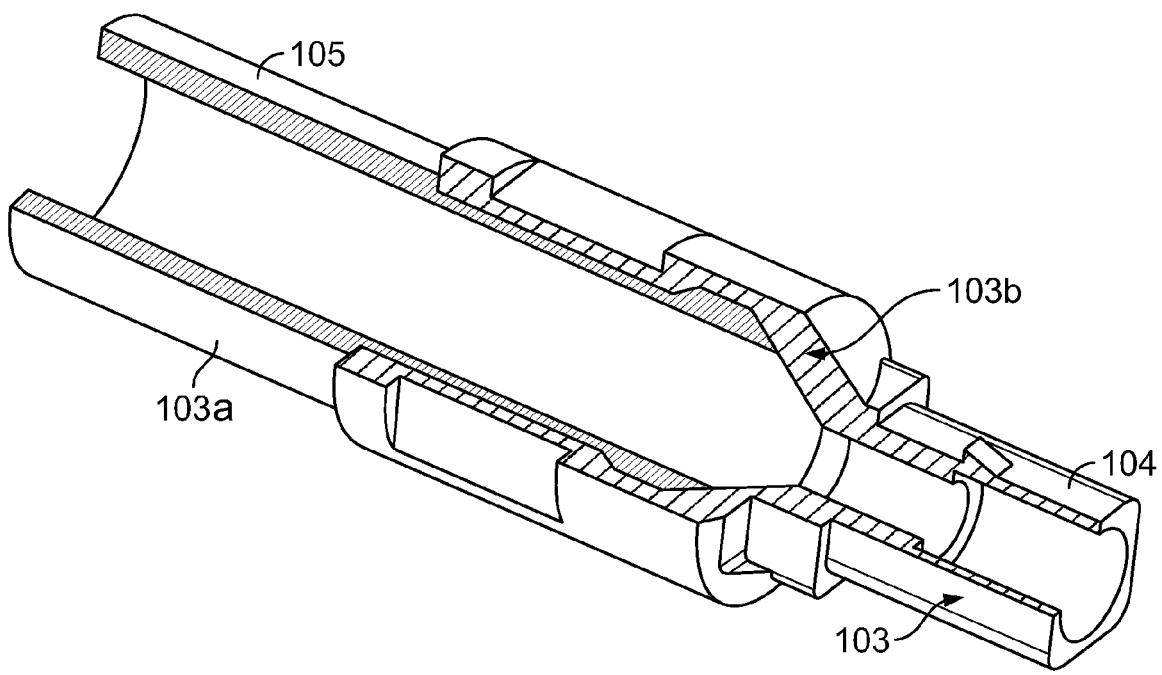
FIG. I-2

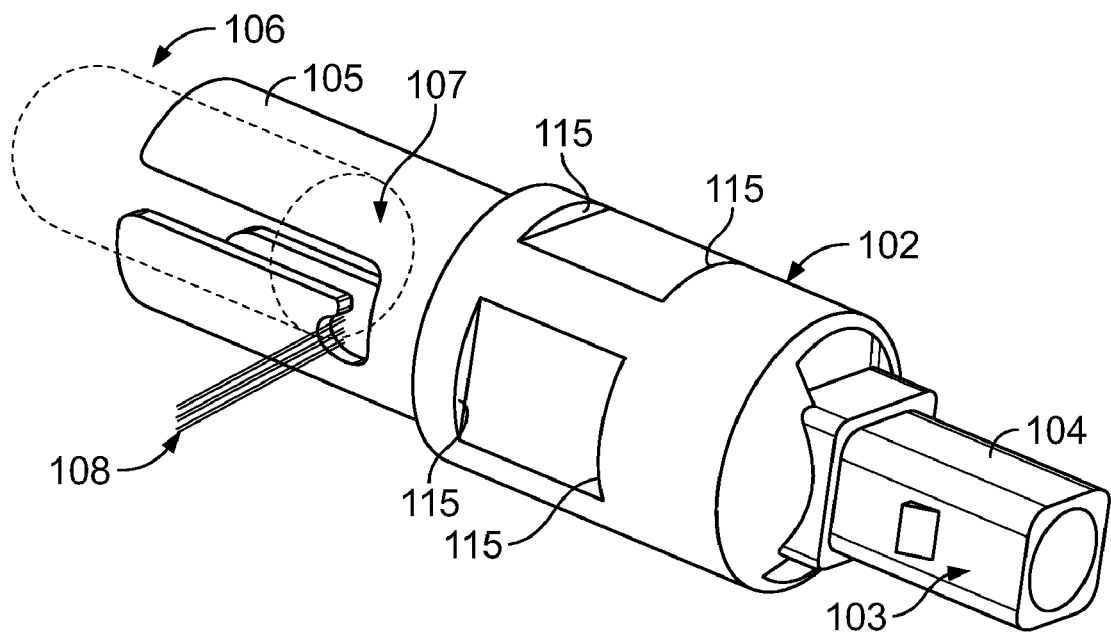
FIG. I-4
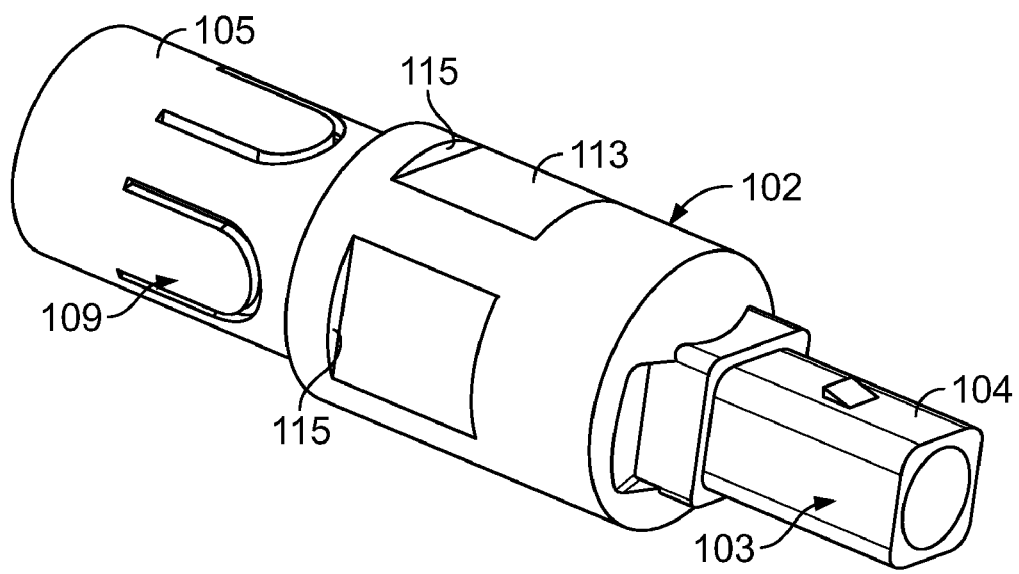
FIG. I-5

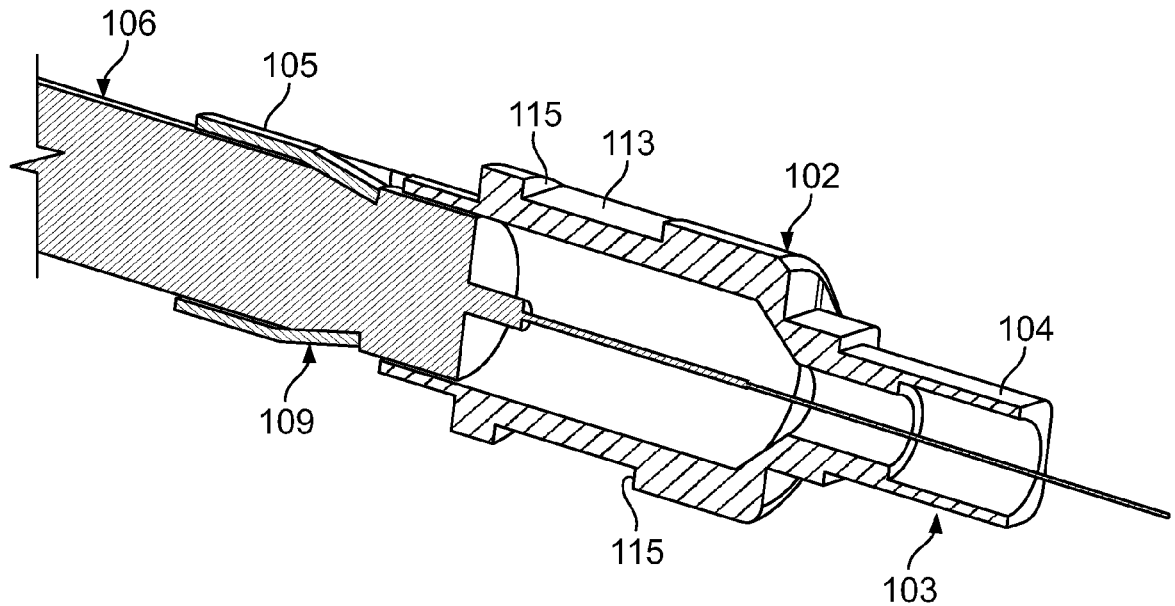
FIG. I-6
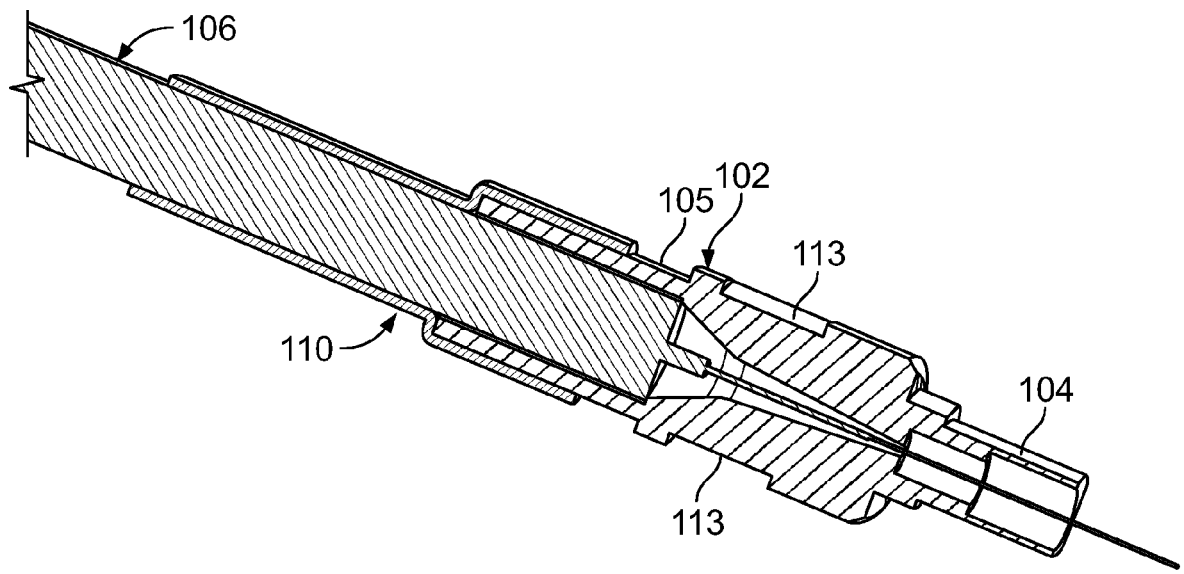
FIG. I-7

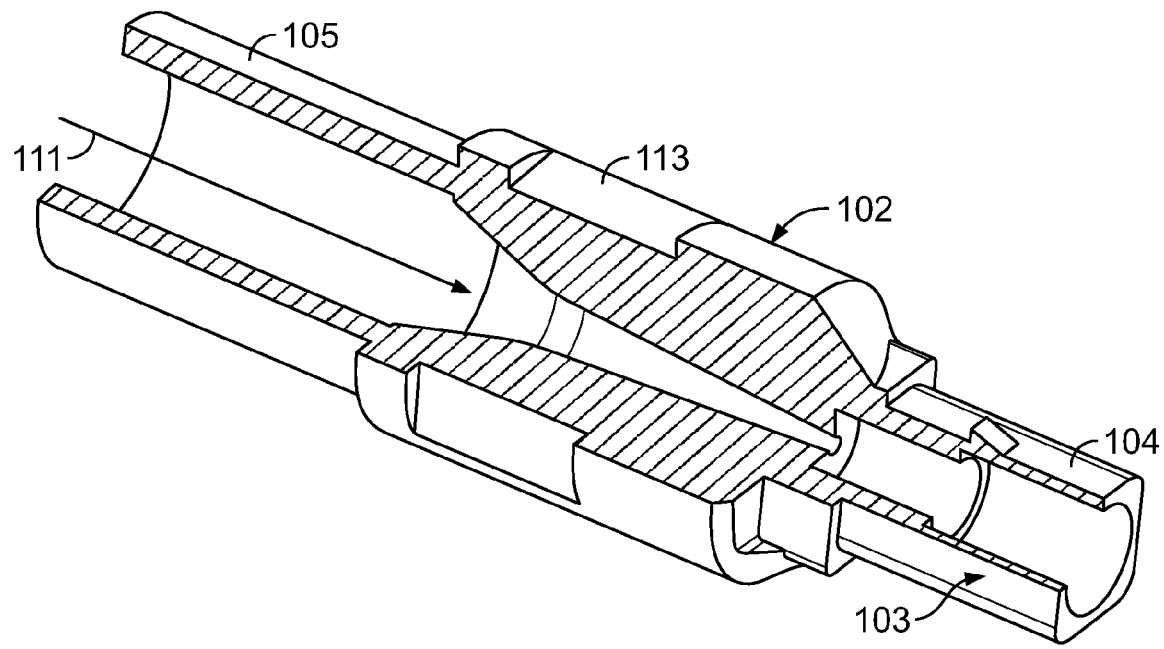
FIG. I-8
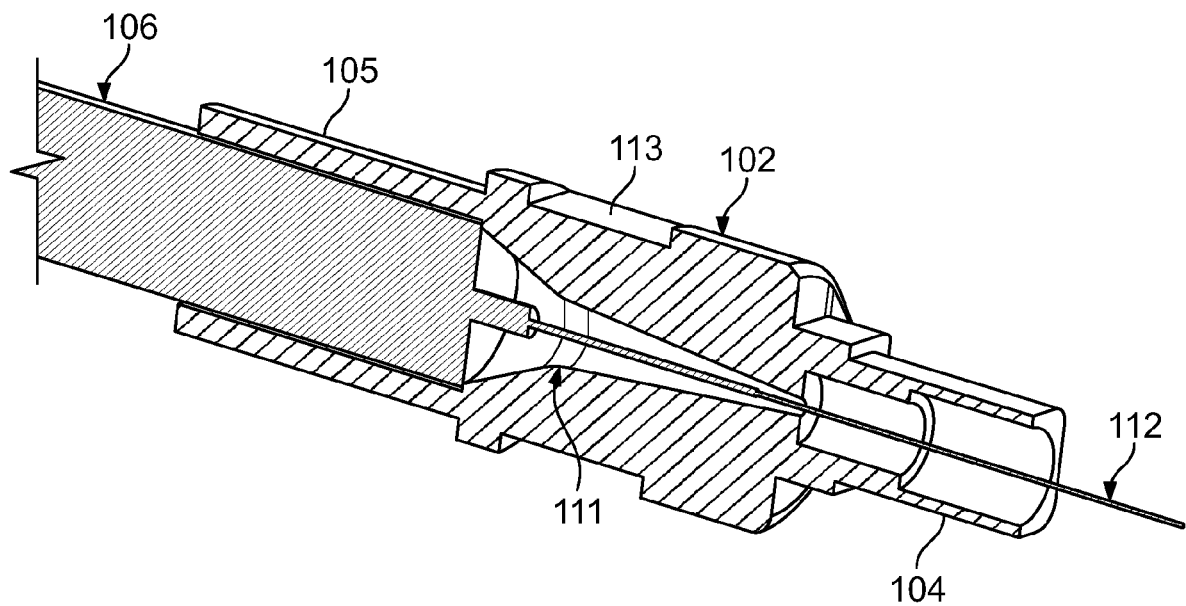
FIG. I-9

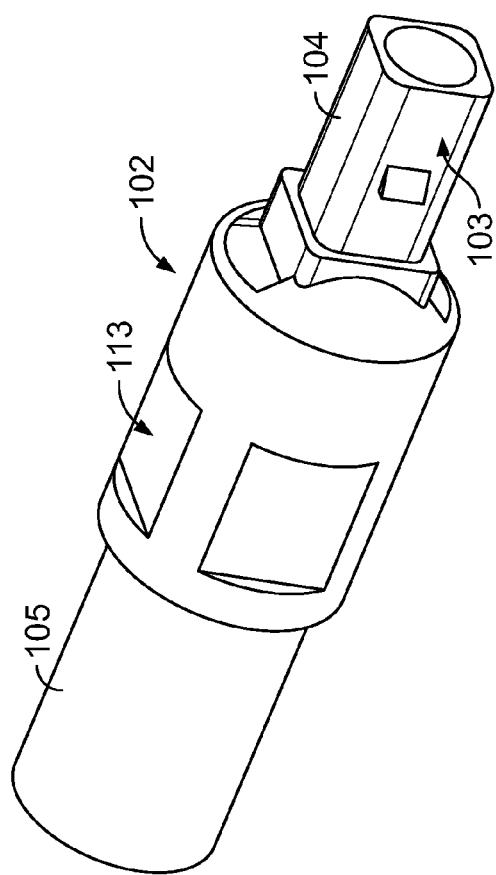
FIG. I-10
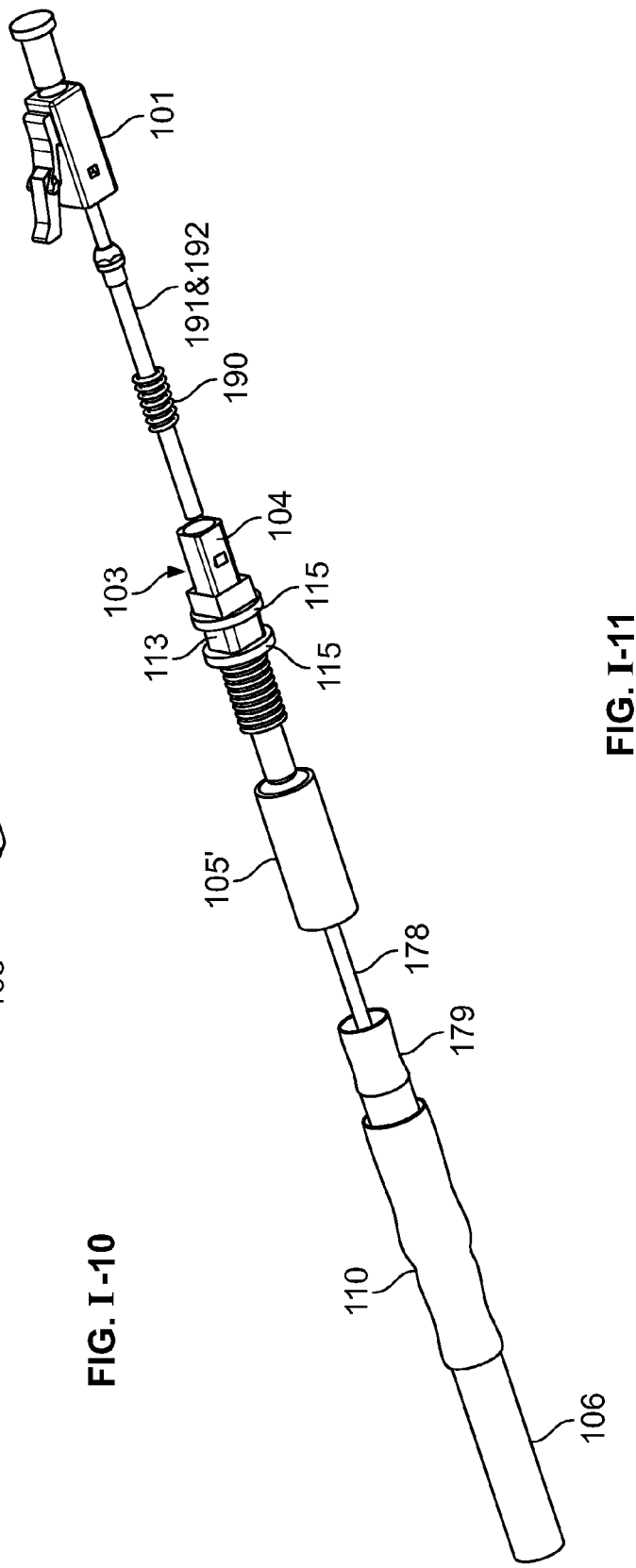
FIG. I-11

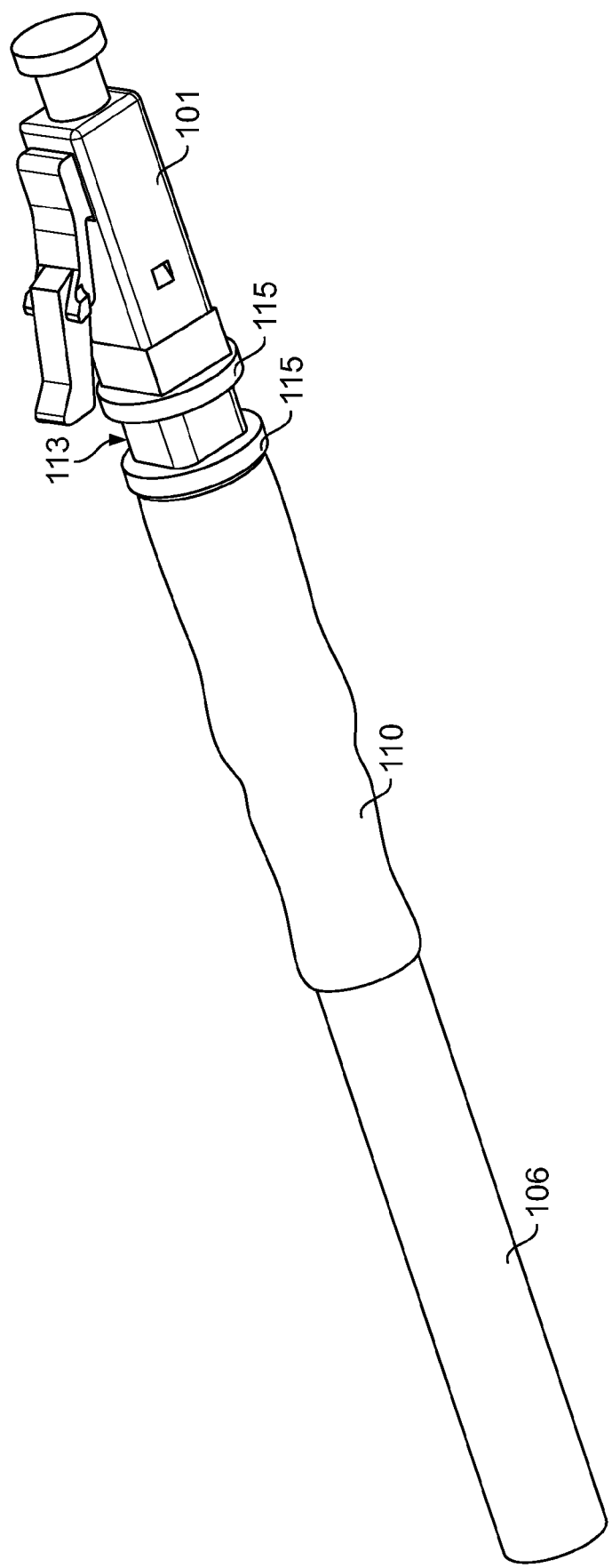
FIG. I-12

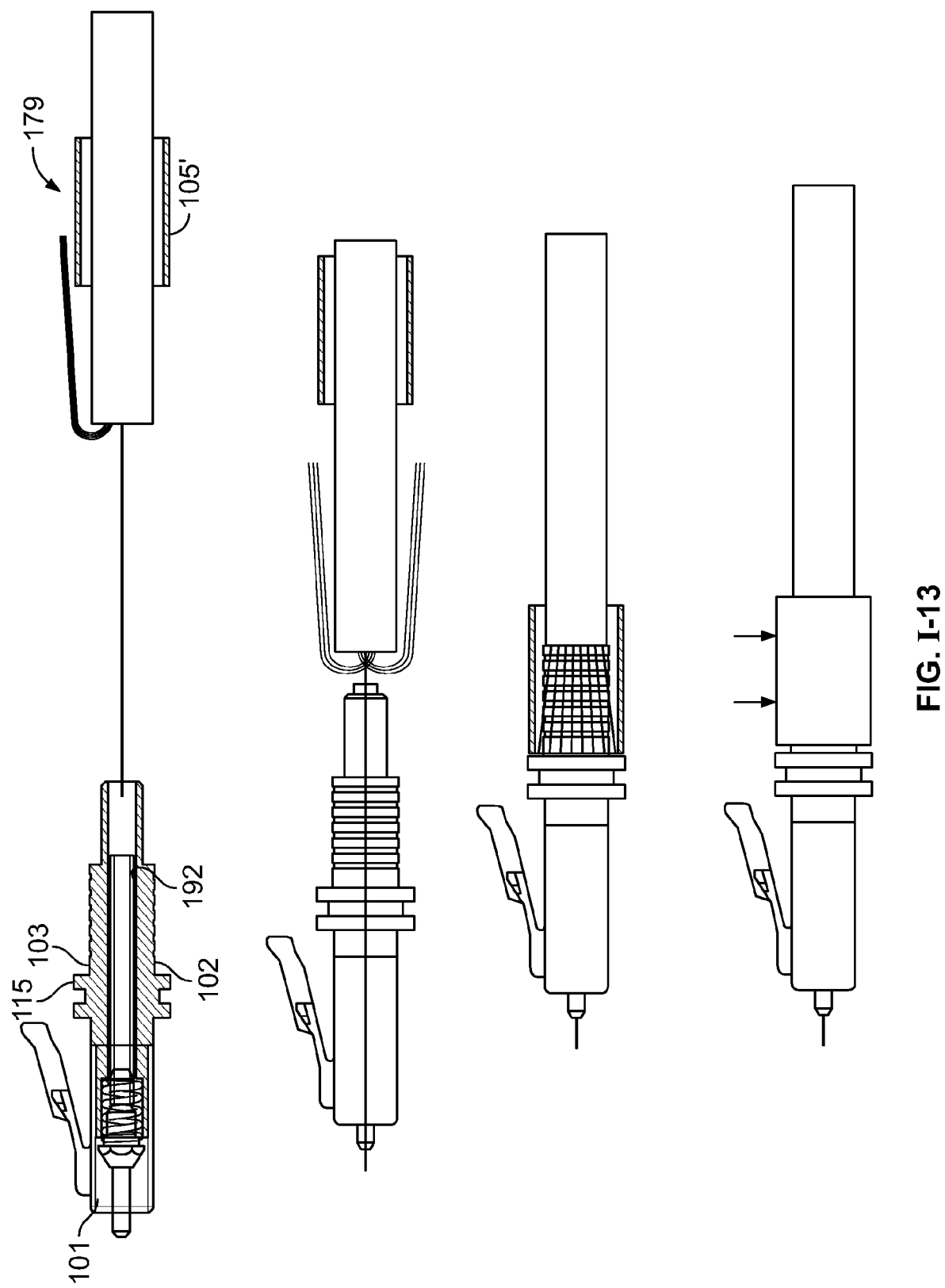
FIG. I-13

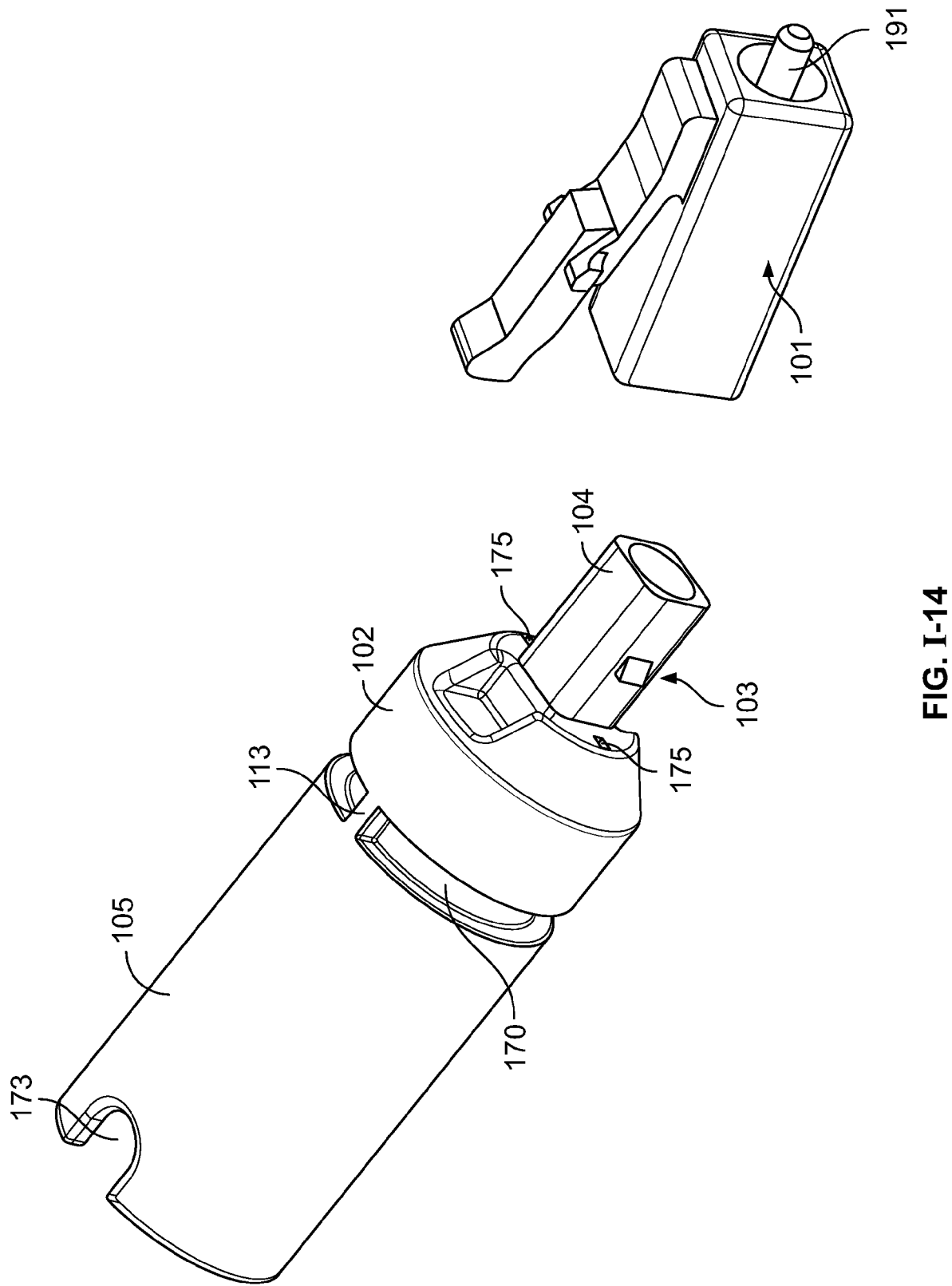
FIG. I-14

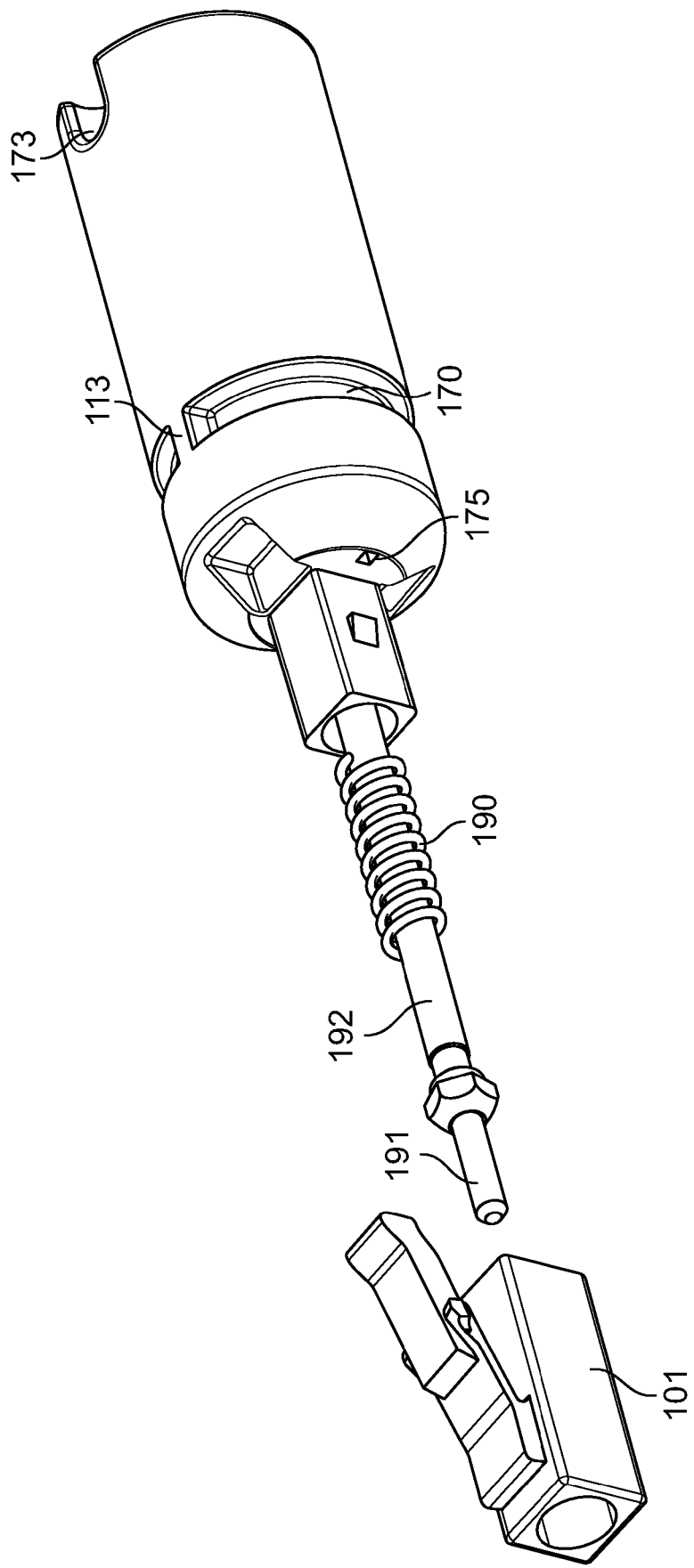
FIG. I-15

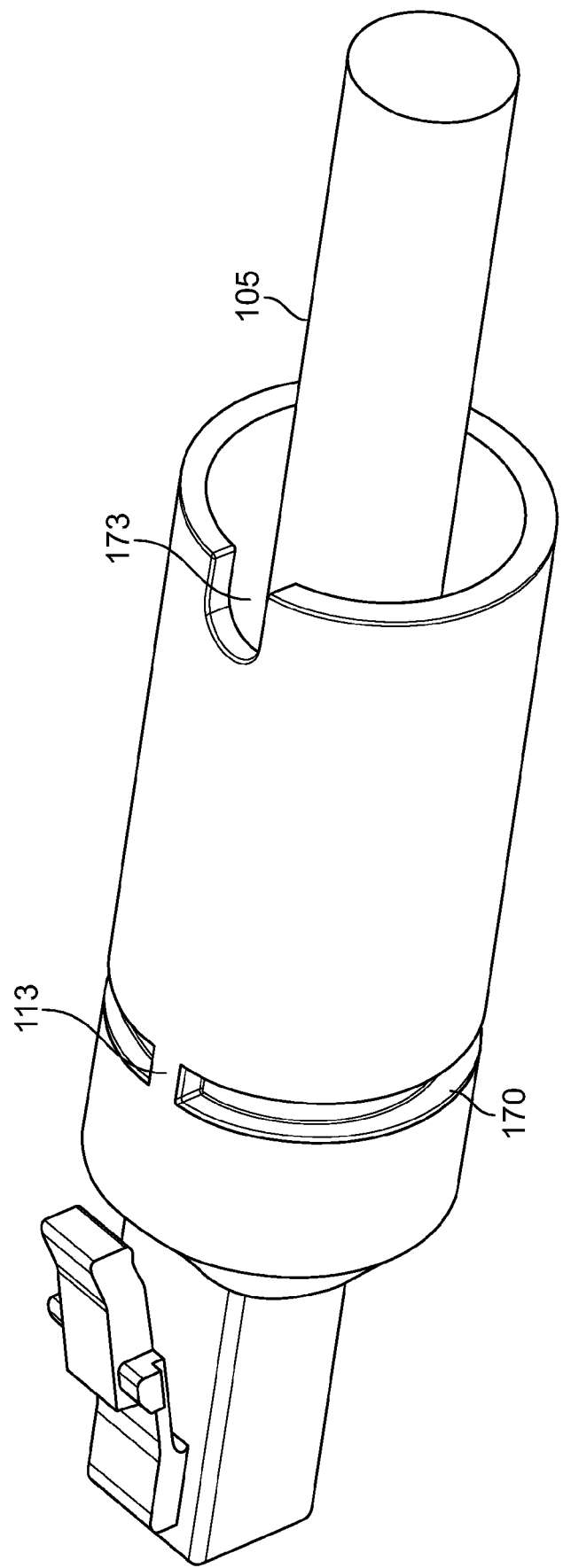
FIG. I-16

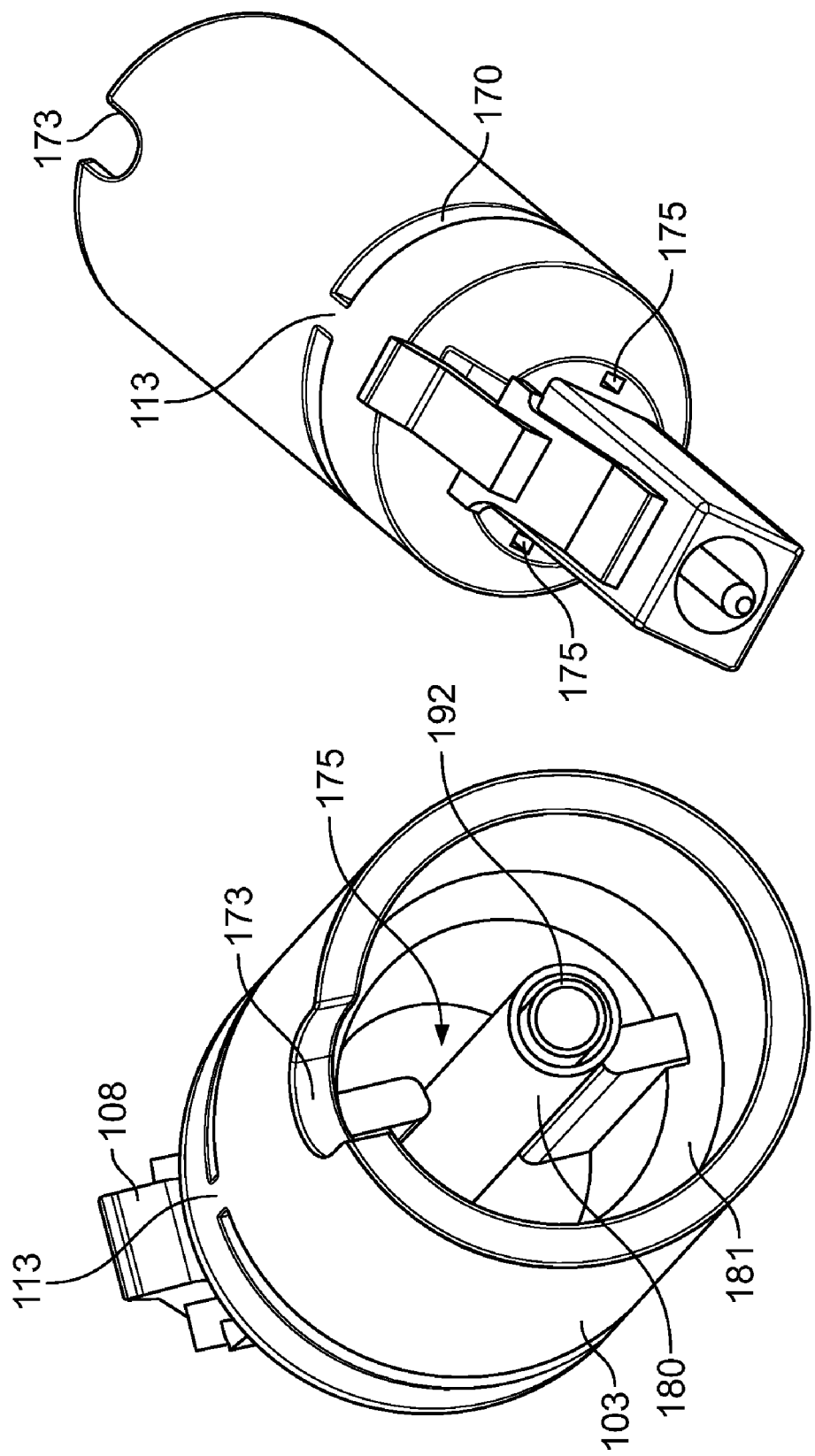
FIG. I-17

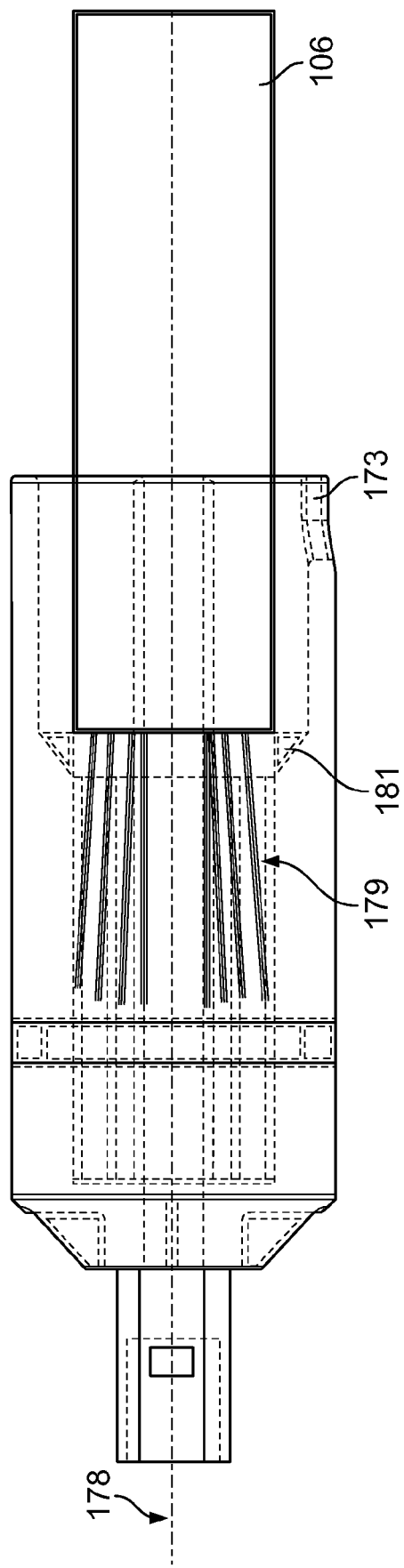
FIG. I-18

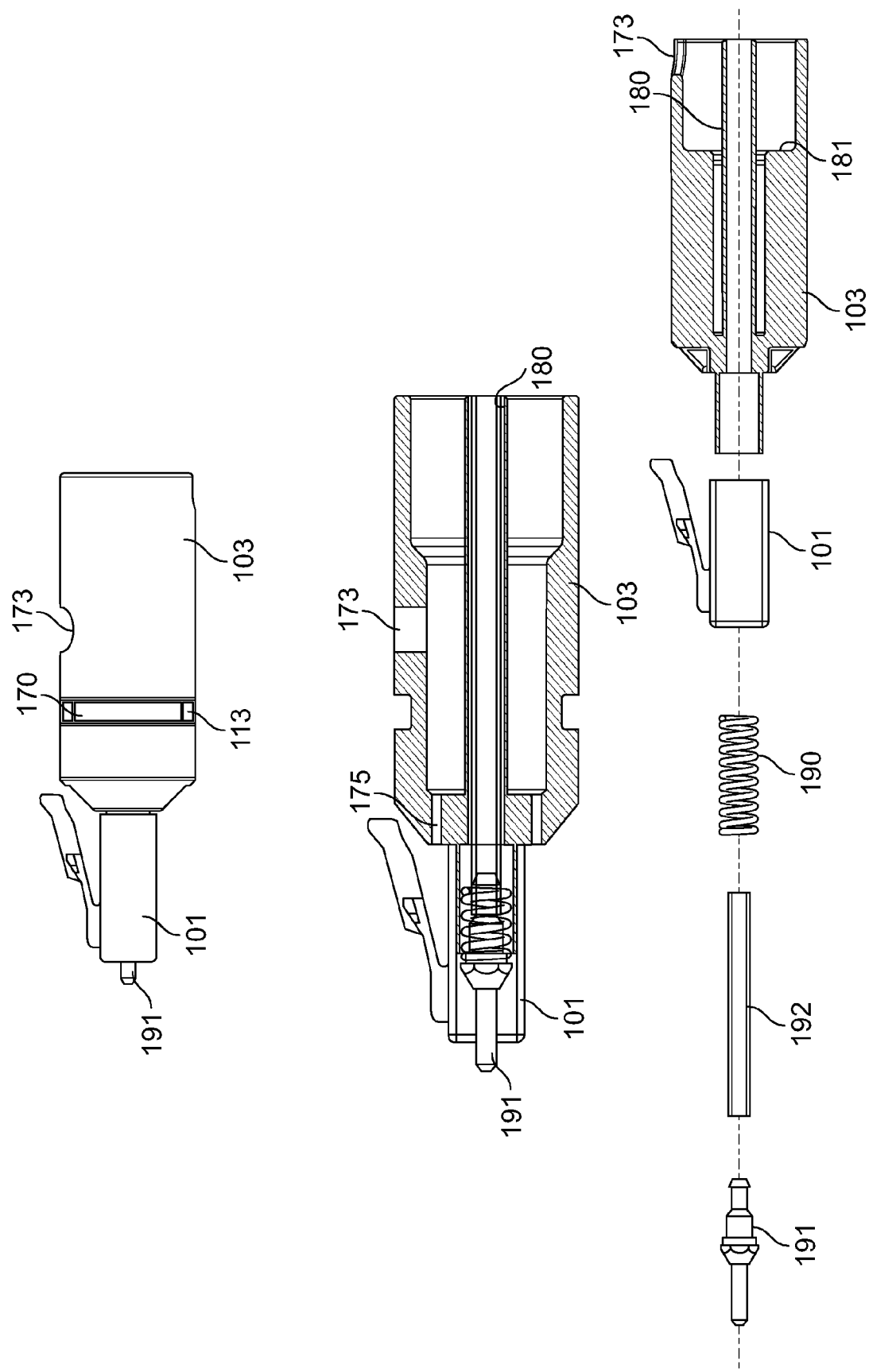
FIG. I-19

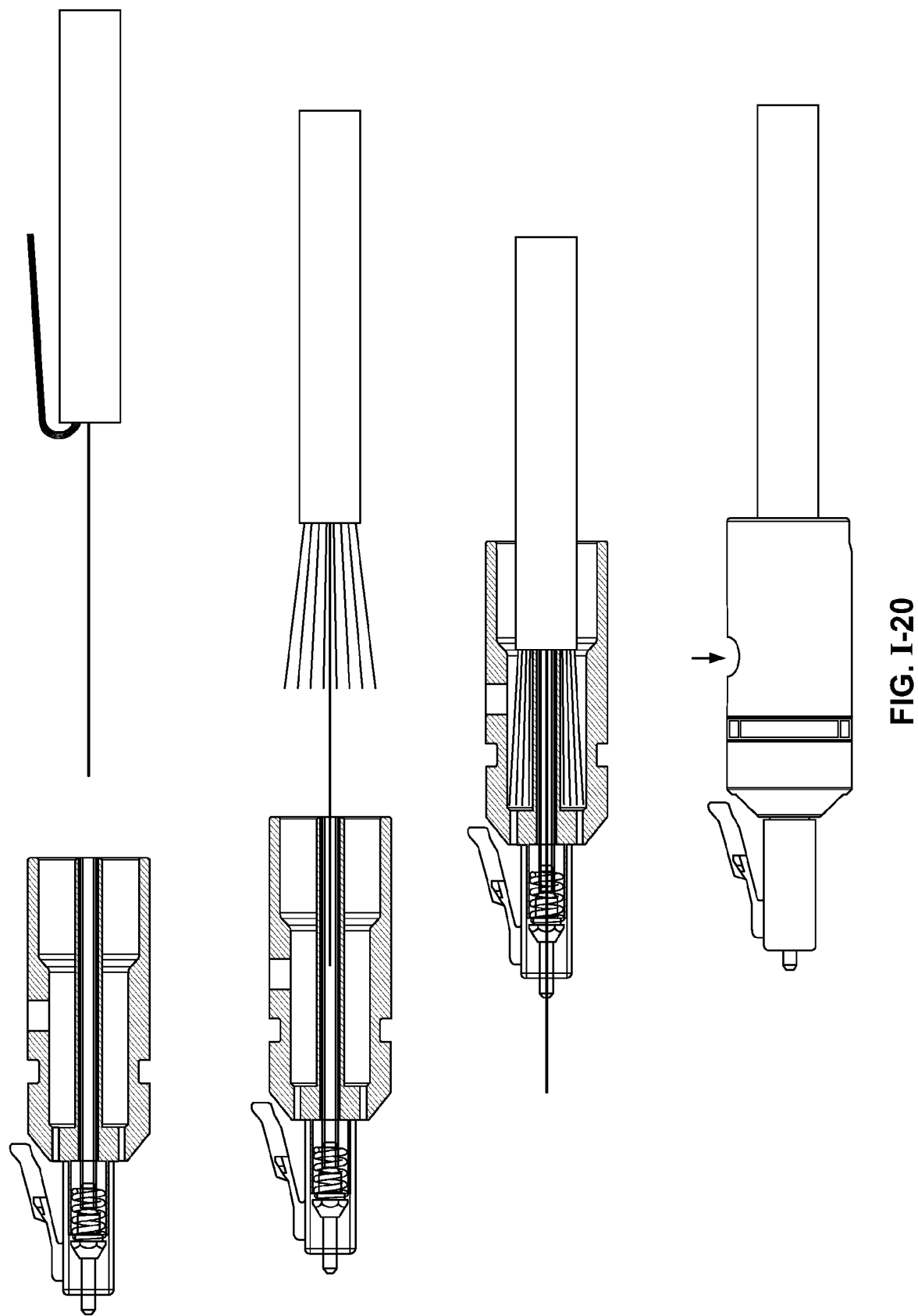
FIG. I-20

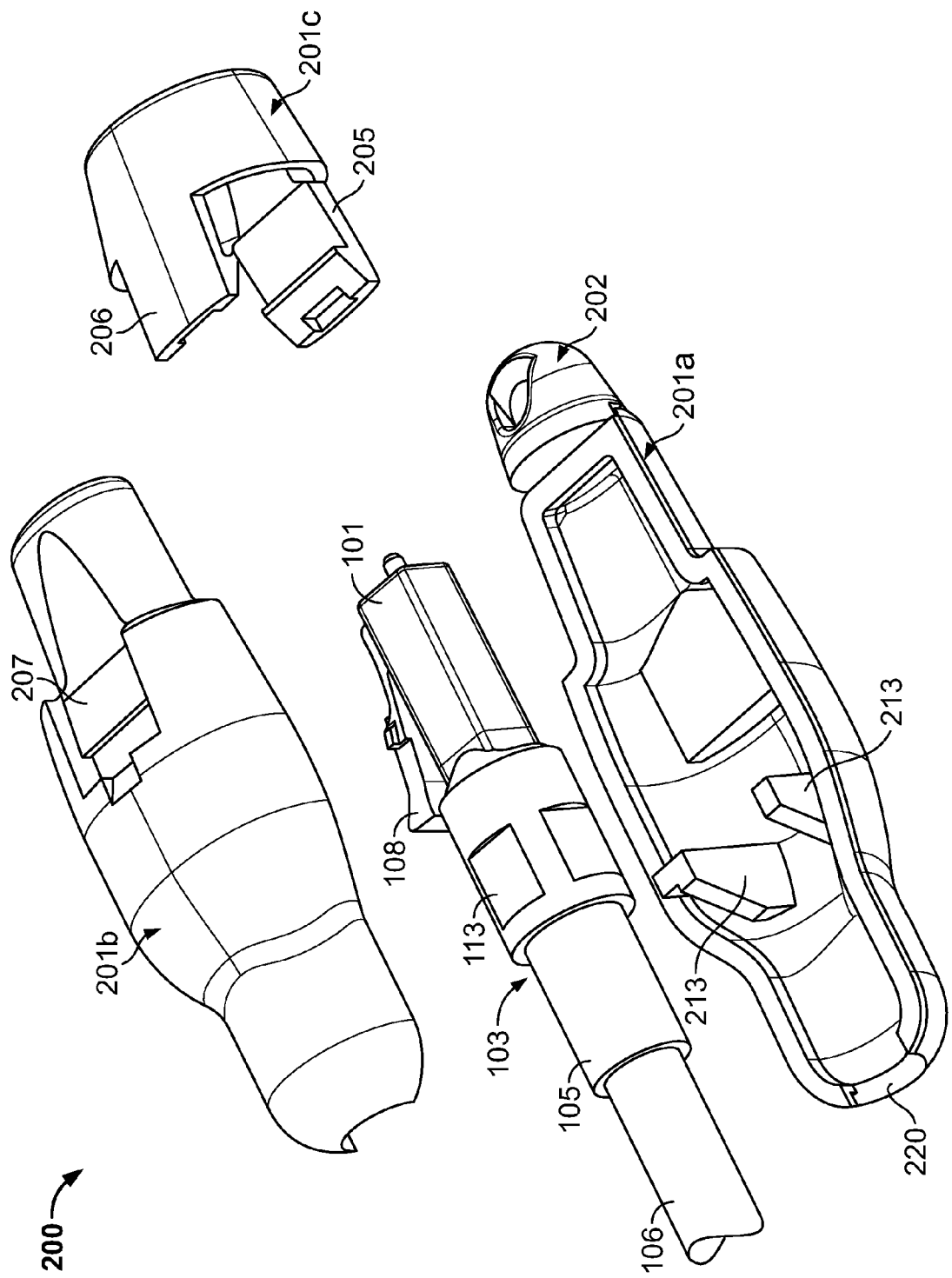
FIG. II-1

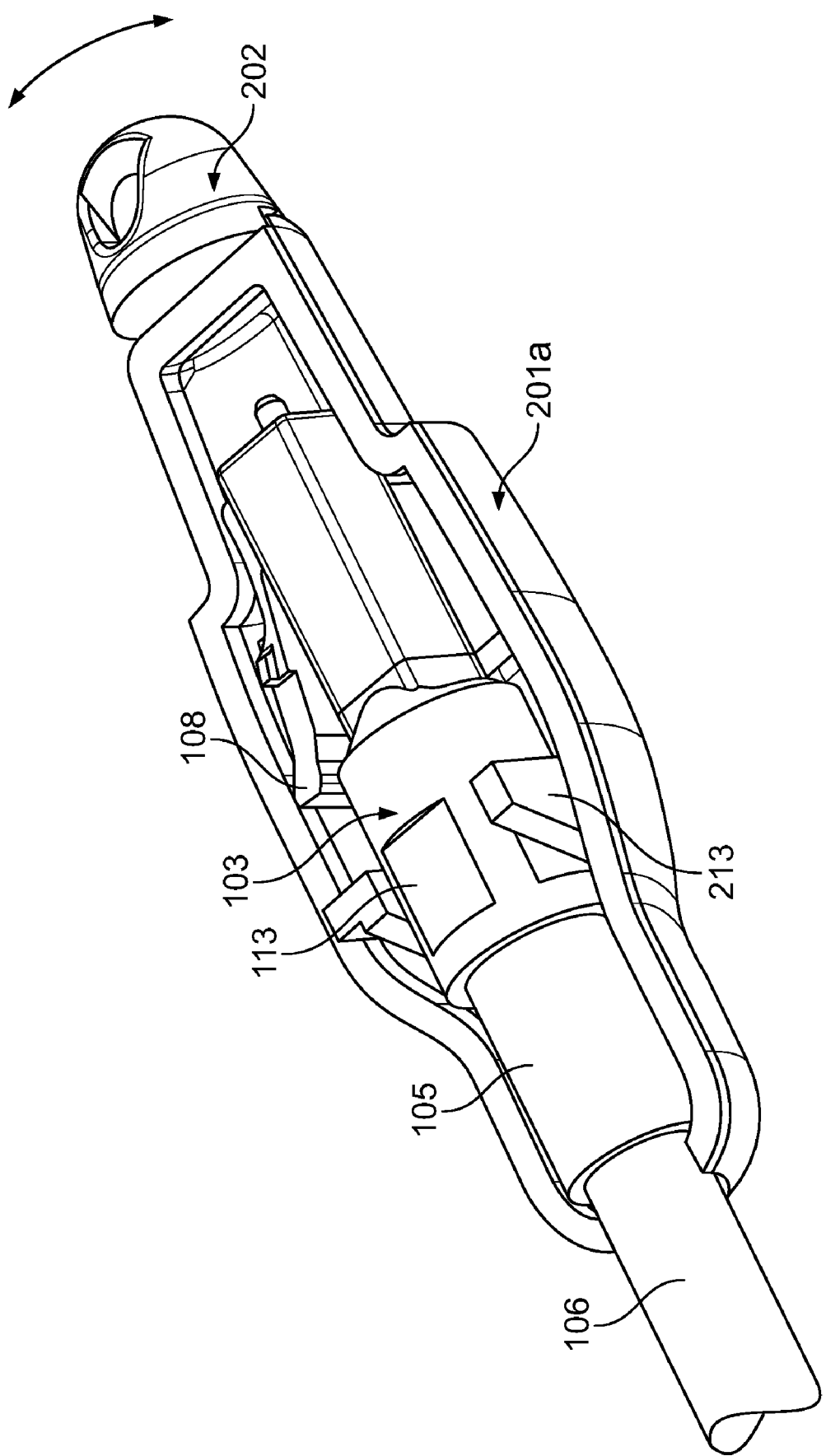
FIG. II-2

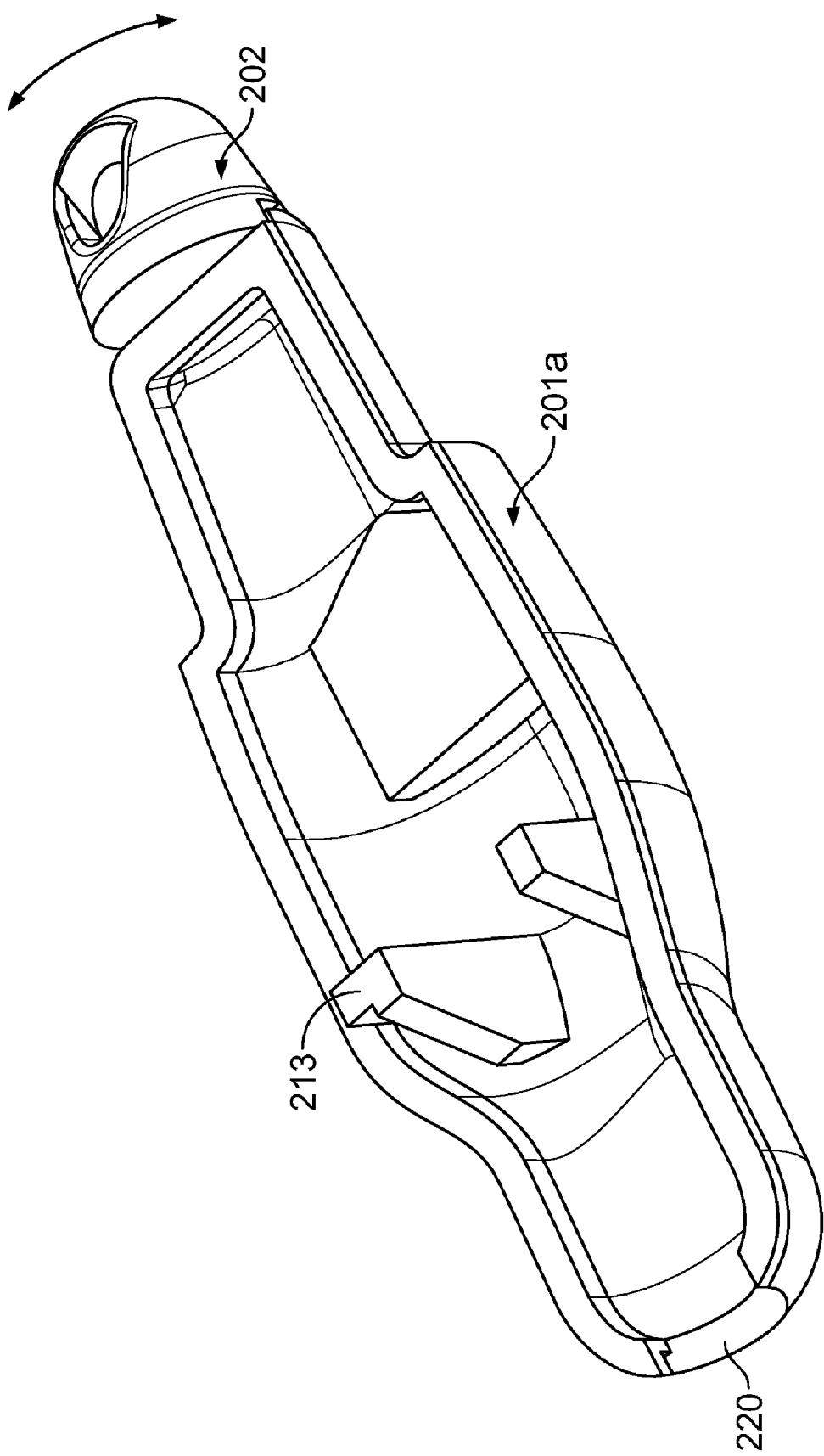
FIG. II-3

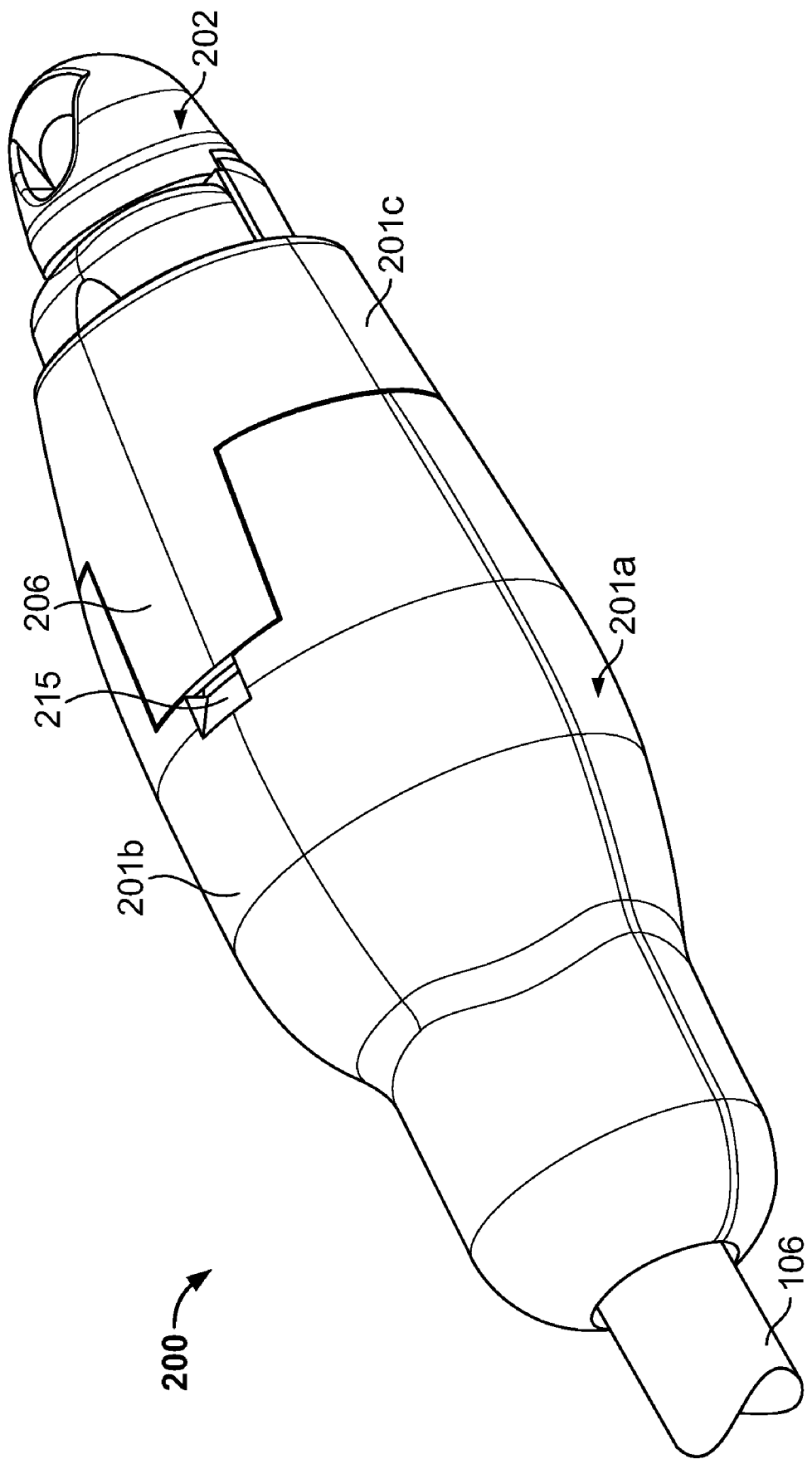
FIG. II-4

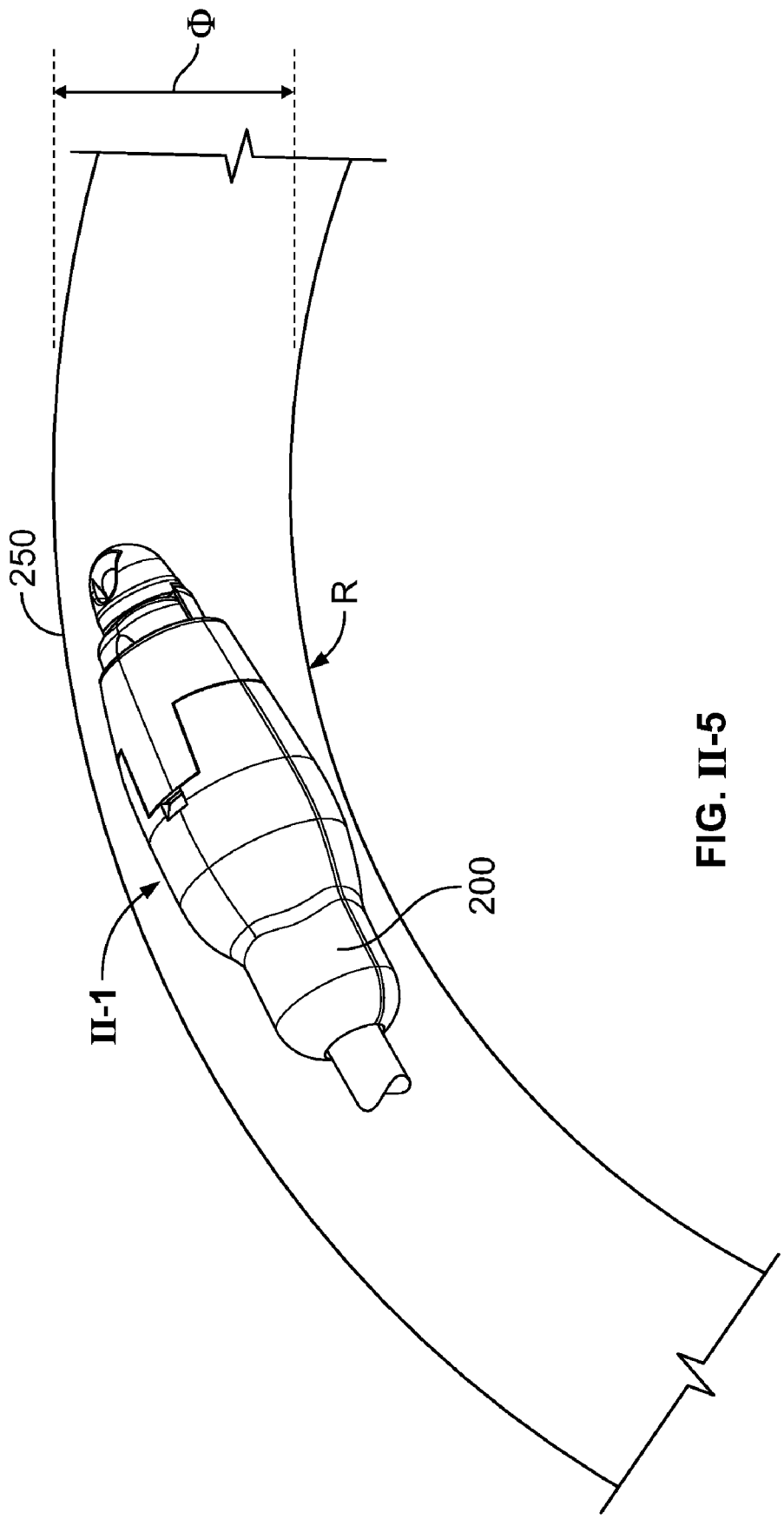
FIG. II-5

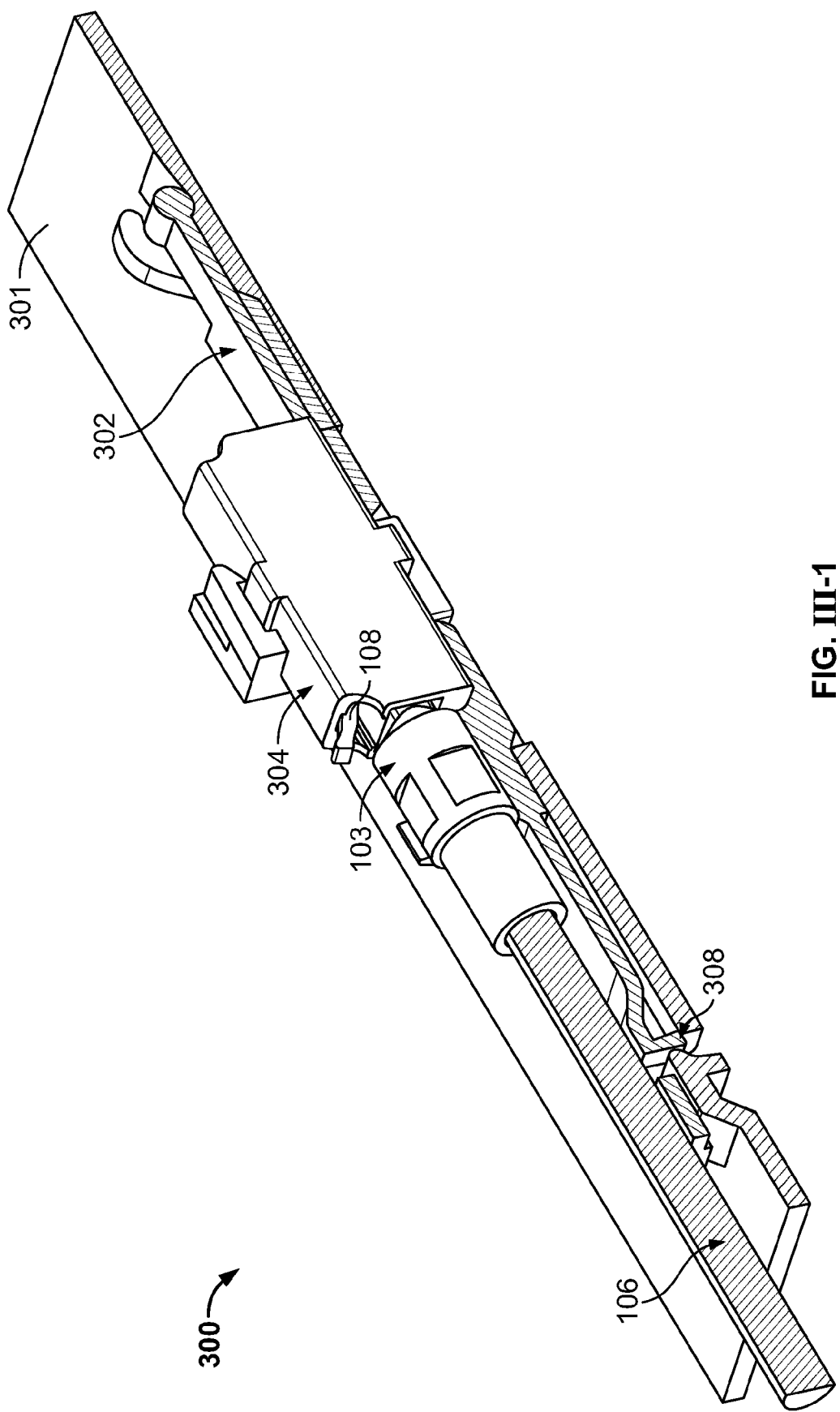
FIG. III-1

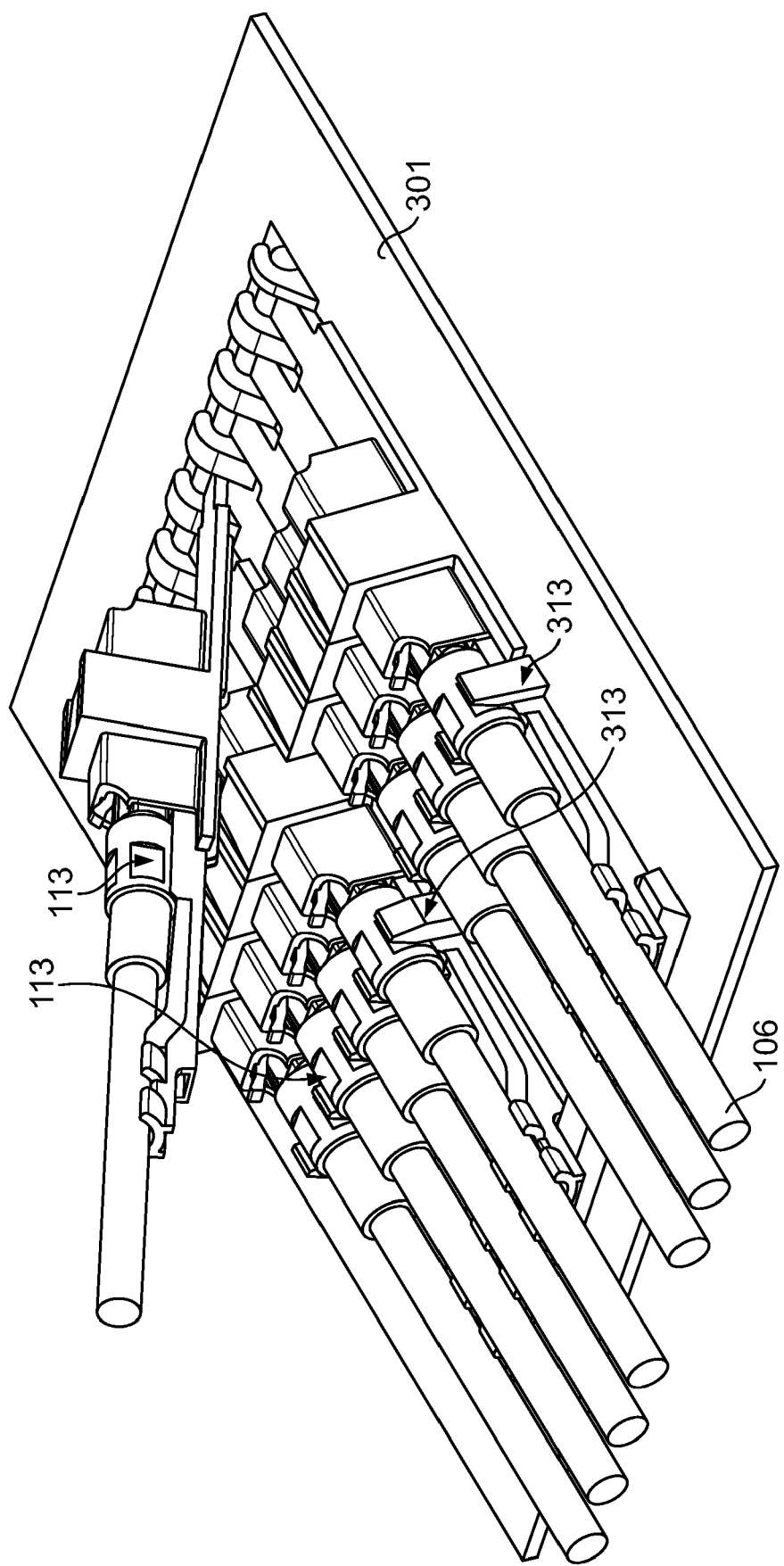
FIG. III-2

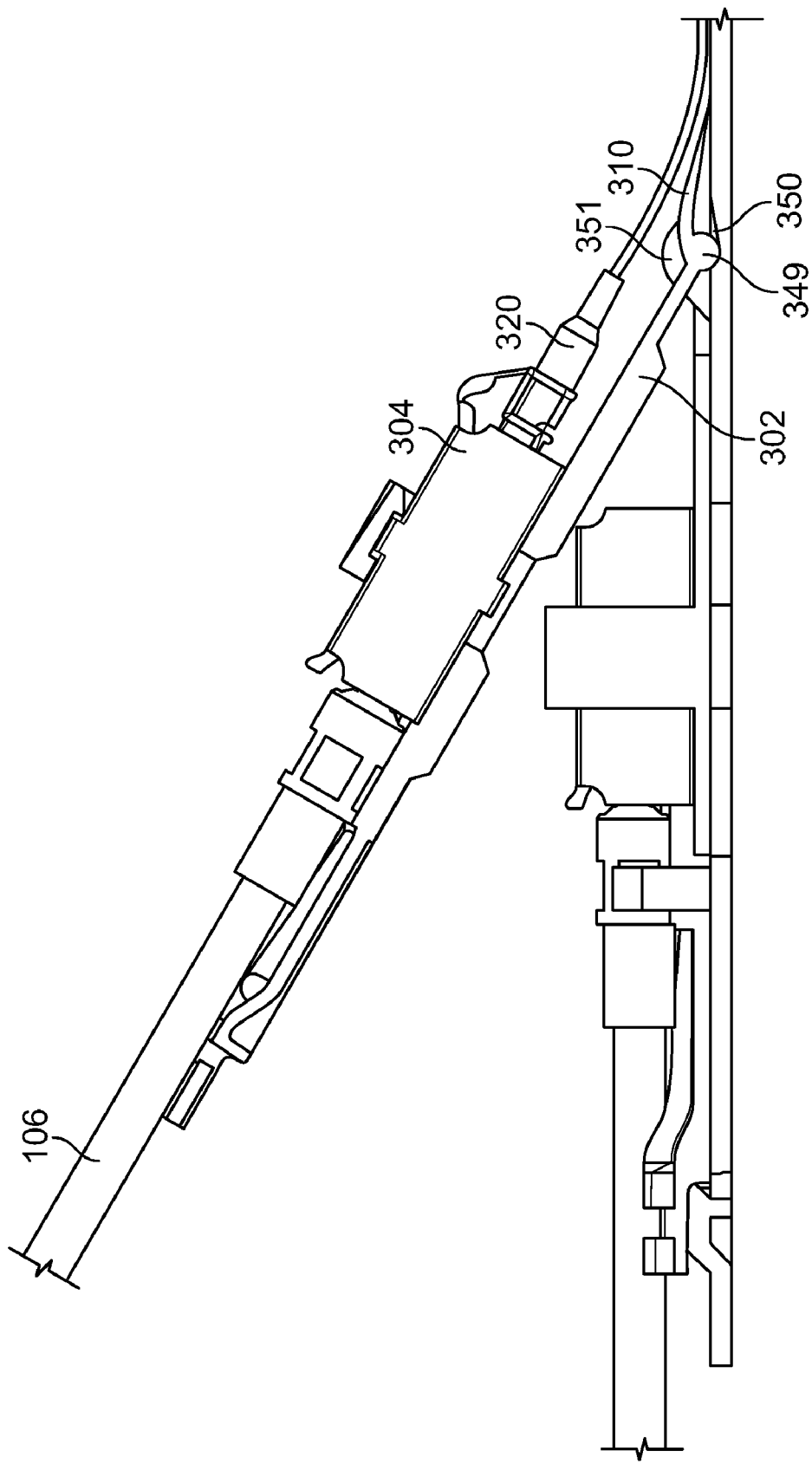
FIG. III-3

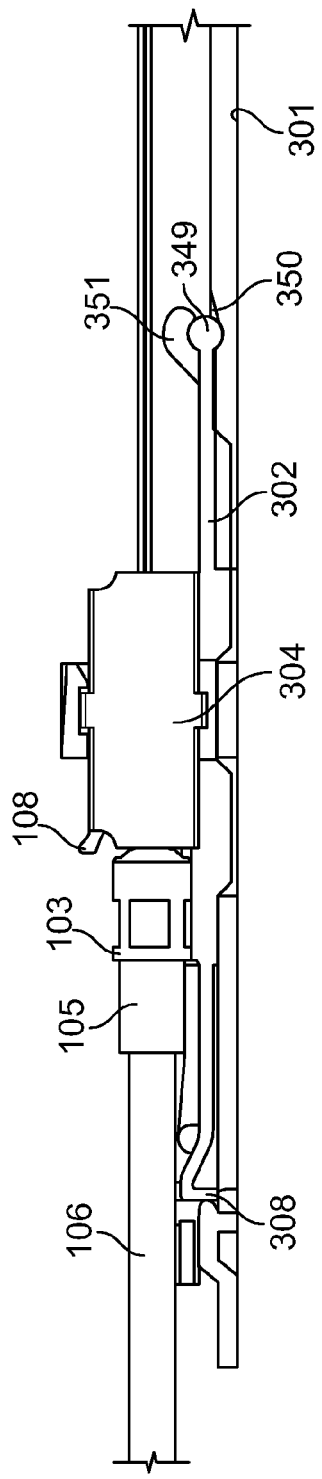
FIG. III-4
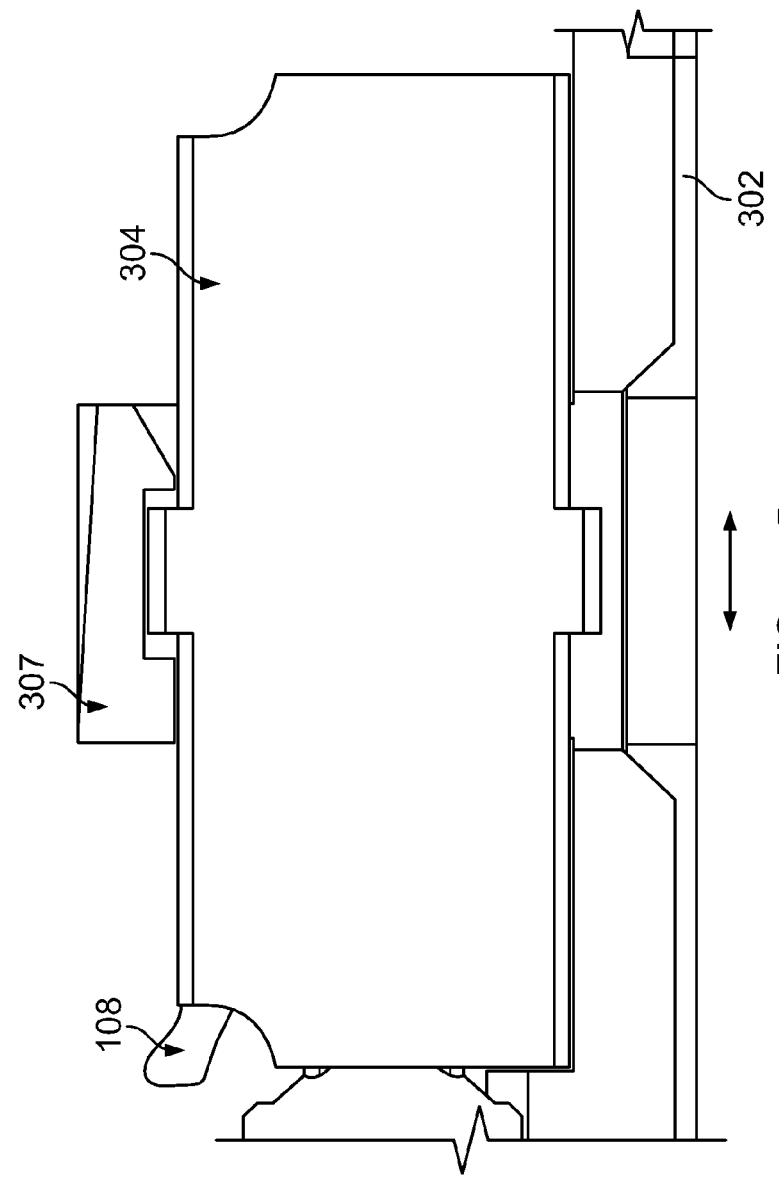
FIG. III-5

OPTICAL FIBRE CONNECTION DEVICE

FIELD OF THE INVENTION

This invention relates to new optical fibre connection devices for making and facilitating optical fibre connections, especially drop cable connections from a telecommunications optical network to subscribers, sometimes referred to a "Fibre To The Home" (FFTH). The devices facilitate physical connection of optical fibre cables in an optical fibre transmission network. The new optical fibre connection devices according to this invention include without limitation:

(I) new derivatives of known LC connectors or other optical fibre cable connectors known per se, these connectors facilitating the physical connection of an optical fibre to a connection terminal in the optical fibre network;

(II) pulling caps for pulling connectorised optical fibre cables through ducts leading to apparatus in the optical fibre network to which the cables are to be connected. These connectorised optical fibre cables are optical fibre cables which are already connected to an optical fibre connector (for example, such as LC connectors), the connector facilitating connectivity of the optical fibre cable in the optical fibre network); and (III) pivotable mountings for advantageous handling of close-packed optical fibre cable connectors used in an optical fibre network.

Optical fibre networks use optical fibres, comprised in optical fibre cables, as data transmission paths. Such networks have numerous data transmission applications, including telecommunications applications. Such data transmission networks need not necessarily comprise only optical fibre cables and associated apparatus, but may make the use of other types of non-optical fibre transmission paths.

BACKGROUND TO THE INVENTION

Screw-threaded connectors and pulling caps for optical fibre cables are described in U.S. Pat. Nos. 6,579,014 and 6,648,520 of Corning Cable Systems, but these are relatively expensive and slow to install, which is a serious commercial handicap when large numbers of such connections are to be made. One or more aspects and embodiments of the present invention provide a lower-cost, easier-to-install, connector.

SUMMARY OF THE INVENTION

According to a first aspect, the present invention provides an optical fibre connection device comprising a part of a multi-part optical fibre cable connector, the multi-parts of the connector being inter-connectable, the part comprising a body, the body comprising:

an optical fibre cable connection end for connection with an optical fibre cable;

a part connection end for connection with another part of the multi-part optical fibre cable connector; and one or more formations adapted to co-operate with a retainer in a mounting for the connector, the mounting used to retain the optical fibre cable and the connector when the optical fibre cable is connected to the optical fibre cable connection end of the body, the formations adapted to co-operate with the mounting retainer to resist rotational and/or axial movement of the connector when the connector is assembled with an optical fibre cable and the other parts of the connector and mounted in the mounting.

The device may comprise a multi-part optical fibre cable connector having a forward part pushably (preferably slidably) inter-connectable with a rearward part, wherein the rearward part of the connector is attached to (preferably integral with a forward end of a body having a rear connection end for connection with an optical fibre cable; and the body has one or more retaining formations adapted to co-operate with a retaining means in a mounting to be used to retain the connector and the optical fibre cable when connected to the body, the body retaining formations in use co-operating with the mounting retaining means to resist rotational and/or axial movement of the connector when assembled and mounted in the mounting.

The connector may be a multi-part screw threadless optical fibre connector, whose parts are releasably interconnectable without requiring relative rotation of the parts of the multi-part connector.

The one or more formations may comprise one or more pairs, for example two pairs, of substantially flat parallel lands, each pair formed on opposed sides of a generally round body.

The formations may comprise a pair of diametrically opposed stop members positioned within a circumferential body channel.

The device may include pulling formations engagable by an optical fibre cable pulling cap for pulling connectorised optical fibre cables through ducts leading to an optical fibre apparatus.

The connector may be adapted to be retained in said mounting closely side-by-side and substantially parallel with one or more similar or substantially identical connectors. The mounting may be an optical fibre cable pulling cap for pulling connectorised optical fibre cables through ducts, the ducts leading to an optical fibre apparatus, the one or more formations being adapted to be retained within a optical fibre cable pulling cap retainer. These mountings may be according to the second aspect of the invention. In such a case, the mounting is a temporary mounting for pulling the connector into a permanently mounted operational configuration/position. In other embodiments, the mounting may be a permanent mounting providing mounting in an operational configuration. The mounting may be adapted to retain the said connector closely side-by-side and substantially parallel with one or more similar or substantially identical connectors.

The one or more formation may be adapted to be retained in a mounting in which at least two multi-part connectors are mounted. These mountings may be according to the third aspect of the invention. The mounting retainer may comprise opposed jaws arranged to abut with the part formations. The part may be arranged to be one part in a connector comprising two or more parts. The connector may be an LC connector. The connector parts may be inter-connectable using a sliding action and incorporate releasable detent means which engage to hold the parts together.

The optical fibre cable connection end may be arranged to be crimped onto an optical fibre cable.

The optical fibre cable connection end may comprise one or more tongues arranged to be deflectable to engage with the jacket of an optical fibre cable, upon insertion of an optical fibre cable into the optical fibre cable connection end, in order to improve strain relief and prevent torsion of the optical fibre cable. The one or more tongues may comprise tongue pairs which are arranged to be diametrically opposed.

The optical fibre cable connection end may comprise a slot arranged to receive optical fibre cable strengthening members. The slot may be L shaped. The optical fibre cable connection end may comprise a heat shrink sleeve to allow sealable connection to the optical fibre cable by heat shrinking.

The body may be arranged to comprise a taper arranged to guide the optical fibre contained within the optical fibre cable through the body and out towards another part of the multi-part connector.

The connector may be a part of a multi-part optical fibre cable arranged to be, in use, slid into the mounting retainer. The connector may be a part of a multi-part optical fibre cable arranged to be, in use, snap-fitted into the mounting retainer.

The part may be entirely made from a metal. The optical fibre cable connection end may be made from a crimpable metal, and the body may be made from a non-crimpable plastic.

The body may comprise an optical fibre tube arranged to separately house the optical fibre of an optical fibre cable from one or more of the sheaths of the optical fibre cable. The body may comprise an aperture for the insertion of glue into the interior of the body to allow adhesive attachment of the optical fibre cable to the interior of the body.

The present invention also provides a multi-part connector comprising the part according to the first aspect. The multi-part connector may comprise a heat shrink sleeve attached to the optical fibre connection end part of the part according to the first aspect.

According to a second aspect, the present invention provides a optical fibre connection device comprising a pulling cap for pulling an optical fibre connector through a duct, the pulling cap having connected thereto a pulling attachment member to which a pulling cable is attachable, the pulling attachment member being rotatable relative to the cap about an axis lying substantially in the pulling direction.

The pulling cap may comprise retaining formations adapted to abut a part of the connector to hold a connector firmly within the pulling cap. The pulling cap may comprise two or more shells releasably assemblable around a connector to encase the connector therein. Encasement of the connector may be complete encasement or partial encasement. The two shells may be separate shells. The shells may be hingedly attached to one another.

The device may comprise a securing member to releasably secure the shells to one another to encase the connector. The device may comprise a securing member to releasably secure the shells to one another to encase the connector, and wherein the securing member and the shells are arranged such that the securing member can be removable from the shells. The device may comprise a securing member to releasably secure the shells to one another to encase the connector, and wherein the securing member comprising an aperture through which the pulling attachment member extends when the pulling cap is assembled.

The interior surface of the cap may be contoured to match the exterior shape of the connector to facilitate firm holding of the connector within the shells.

One of the shells may comprise upstanding retaining formations located on the interior of the shell arranged to engage with complementary formations on the exterior of the connector to hold the connector firmly in place and to prevent relative rotation of the connector with respect to the shell when the connector is held within the shell.

The device may be arranged to encase an LC connector. The device may be arranged to encase a device according to the first aspect of the invention. The connector may be arranged to be crimped or otherwise attached to an optical fibre cable having a jacket and/or a flexible tension-resisting member.

According to a third aspect, the present invention provides an optical fibre connection device comprising an optical fibre connector mounting, the mounting comprising a support and an optical fibre connector housing, the housing being pivotably attachable to the support for pivotal movement between first and second positions with respect to the support, the first position being an operating position in which the housing lies on or closely adjacent the support and the second position being an access position in which the optical fibre connector housing is moved angularly away from the support to allow access to the optical fibre connector housing.

The optical fibre connector housing may be a housing for a part of a multi-part optical fibre cable connector. The optical fibre connector housing may be arranged to integrally comprise the housing of a part of a multi-part optical fibre cable connector. The optical fibre connector housing may be arranged to removably house a part of a multi-part optical fibre connector. The optical fibre connector housing may be mounted on a pivot arm, one end of the pivot arm being arranged to be pivotably attachable to the support for moving the housing between the first and second positions.

The optical fibre connector may be for a part of an LC connector. The optical fibre connector housing may be mounted on a pivot arm, the housing being arranged to be moveable along the pivot arm. The optical fibre connector housing may be mounted on a pivot arm, the housing being arranged to be moveable along the pivot arm in the first mounted position. The optical fibre connector housing may be removable from the support.

The support may comprise one or more mounting retainers arranged to co-operate with one or more corresponding formations on an optical fibre connector to hold the connector to resist rotational and/or axial movement of the connector when the housing is in the first mounted position and the housing is arranged to comprise the connector.

The mounting may be arranged to provide a controlled second access position of the housing, the controlled second access position providing a maximum movement position of the housing away from the first position to control bending of an optical fibre connected to the end of the housing nearest the pivot point.

The controlled second access position may be provided by a stop arm which is arranged to extend from a pivot arm comprising the housing.

The housing may be arranged to pivot with respect to the support by a pivot arrangement, the pivot arrangement comprising a curved retaining member arranged to extend out of the operating face of the support and within which a pivot arm, which comprises the housing, is arranged to be pivotable.

The housing may be arranged to pivot with respect to the support by a pivot arrangement, the pivot arrangement comprising a curved retaining member integrally formed with the support to extend out of the operational face of the support.

The pivot arrangement may comprise a rounded pivot member and a corresponding curved retaining member, the rounded pivot member located at the pivoting end of a pivot arm comprising the housing, and the curved retaining member arranged to extend out of the operating face of the support.

The housing may be arranged to pivot with respect to the support by a pivot arrangement, the pivot arrangement comprising a depression formed into the operating face of the support in which a pivot arm is pivotably locatable.

The second access position may provide an access position which is away from interference by the support.

The mounting may comprise two or more adjacent optical fibre connector housings, a plurality of the adjacent housing being arranged to moveable between the first and second positions.

The mounting may comprise two or more adjacent optical fibre connector housings, a plurality of the adjacent housing being arranged to moveable between the first and second positions, the second position providing access to one housing without interference from an adjacent housing.

The mounting may comprises two or more adjacent optical fibre connector housings, a plurality of the adjacent housing being arranged to moveable between the first and second positions, the second position providing access to one housing without interference from an adjacent connectorised optical fibre cable connected to the adjacent housing.

The mounting may comprise two or more adjacent optical fibre connector housings, a plurality of the adjacent housing being arranged to moveable between the first and second positions, on a common support.

The housing may be arranged to snap-fit into the support in the first mounted position.

The present invention also provides a housing according to the third aspect of the invention. The present invention also provides a support according to the third aspect of the invention. The present invention provides an optical fibre network comprising an optical fibre connection device according to the first, second or third aspect of the invention. The present invention provides a method of making an optical fibre connection using an optical fibre connection device according to the first, second or third aspect of the invention.

One or more aspects and embodiments of the present invention can relate to multi-part screw threadless optical fibre connectors, these connectors being releasably interconnectable without requiring relative rotation of the parts of the multi-part connector.

The invention encompasses one or more previously/subsequently mentioned features, embodiments and/or aspects of the invention in isolation and in all various combinations whether or not specifically mentioned or claimed in isolation or that combination, and includes methods of making optical fibre connections using the same.

BRIEF DESCRIPTION OF THE FIGURES

Embodiments of the various aspects of the invention are illustrated in more detail, by way of example, with reference to the accompanying drawings, in which:

FIGS. I-1 to I-20 illustrate an optical fibre connection device according to a first aspect of the present invention.

FIG. I-1 provides a perspective view of a multi-part optical fibre cable connector comprising an optical fibre connection device according to a first aspect of the invention;

FIG. I-2 shows a partial section through two embodiments of an optical fibre connection device according to the first aspect of the invention;

FIGS. I-3, I-4, and I-5 each show perspective views of an embodiment of an optical fibre connection device according to a first aspect of the invention;

FIG. I-6 shows a cross section through the embodiment of FIG. I-5 when engaged with an optical fibre cable;

FIG. I-7 shows a cross section through an embodiment of an optical fibre connection device according to a first aspect of the invention comprising a heat shrink sleeve and an internal taper;

FIG. I-8 shows a partial cross section through an embodiment of an optical fibre connection device according to a first aspect of the invention comprising an internal taper;

FIG. I-9 shows a cross section through another embodiment of an optical fibre connection device according to a first aspect of the invention;

FIG. I-10 shows a perspective view of an optical fibre connection device according to a first aspect of the invention;

FIG. I-11 shows a perspective view of assembly components of an optical fibre connection device according to another embodiment of the first aspect of the invention;

FIG. I-12 shows a perspective view of assembled components of the optical fibre connection device of FIG. I-11;

FIG. I-13 illustrates the assembly steps involved in the assembly of the optical fibre connection device of FIG. I-11;

FIG. I-14 illustrates an optical fibre connection device according to a different embodiment of the first aspect of the present invention;

FIG. I-15 illustrates another view of the optical fibre connection device of FIG. I-14;

FIG. I-16 illustrate a further view of the optical fibre connection device of FIG. I-14 with optical fibre cable inserted;

FIG. I-17 illustrates two further view of the optical fibre connection device of FIG. I-14;

FIG. I-18 illustrates a cross sectional view through the optical fibre connection device of FIG. I-14;

FIG. I-19 is a cross section through components used to assemble optical fibre connection device of FIG. I-14; and FIG. I-20 illustrates the method steps in the assembly of the optical fibre connection device of FIG. I-14.

FIGS. II-1 to II-5 illustrate a optical fibre connection device, comprising a pulling cap, according to a second aspect of the present invention.

FIG. II-1 shows, in perspective view the components parts of a pulling cap and a connectorised optical fibre cable connected to a optical fibre connection device according to the first aspect of the invention;

FIG. II-2 shows the connectorised optical fibre of FIG. II-1 housed in the base component of the pulling cap according to the second aspect of the invention;

FIG. II-3 shows the base component of the pulling cap according to the second aspect of the invention;

FIG. II-4 shows a connectorised optical fibre cable assembled in a pulling cap according to the second aspect of the invention; and FIG. II-5 shows the use of a pulling cap according to the second aspect of the invention through a duct.

FIGS. III-1 to III-5 illustrate an optical fibre connection device comprising a pivotable mounting according to a third aspect of the present invention.

FIG. III-1 provides a perspective view of an optical fibre connection device according to the third aspect of the invention upon which is mounted a connectorised optical fibre cable;

FIG. III-2 provides a perspective view of an optical fibre connection device in which the mounting comprises a number of adjacent housing with connectorised optical fibre cables;

FIG. III-3 provides a side perspective view of a connectorised optical fibre cable connected to a housing in the second access position according to the third aspect of the invention;

FIG. III-4 provides a side perspective view of a connectorised optical fibre cable connected to a housing in the first mounted position according to the third aspect of the invention;

FIG. III-5 provides a side perspective view of a housing according to the third aspect of the invention.

DESCRIPTION OF SPECIFIC EMBODIMENTS

Various types of optical fibre connection devices 103, 200, 300 according to one or more aspects of the present invention are shown in the accompanying figures. Let us first consider embodiments of the optical fibre connection device 103 according to the first aspect of the invention (FIGS. I-1 to I-2).

Examples of optical fibre connection devices 103, according to the first aspect of the invention are illustrated in FIGS. I-1 to I-20. These embodiments relate to a slim termination and strain relief device for connectorized drop cables in which a rear part 103 of a known multi-part LC connector (100, FIG. I), has a body 102, which has a section 105 which can be crimped or otherwise connected to a cable 106 by any type of mechanical fixture.

It can be seen from FIG. I-1 that the multi-part LC connector 100 comprises two parts which can be releasably snap-fitted together; a front terminal part 101 and a rear cable connection part 103. The front terminal part 101 houses a ferrule 191 to which the bare optical fibre 178 of the optical fibre cable 106 is attached. The ferrule 191 allows optical connection of the optical fibre 178 to another optical fibre (not shown) by physical contact of ferrule ends in a known manner (contact being maintained between two mating ferrules using a spring 190).

Although the embodiment shown in FIG. I-1 provides releasably snap-fitted parts, which can me mated without relative rotation of the parts 101 and 103, in other configurations the front and rear parts 101, 103 may be screw-fitted together, crimped, or glued together, or a combination or variation of such methods.

The first aspect of the invention provides modifications to this rear part 103, which is considered to be an optical fibre connection device. Thus, the foregoing description will focus on details of this rear cable connection part 103 and not on details of the front terminal part 101.

As can be seen from FIG. I-1, the rear cable connection part 103 comprises a main body 102. This body comprises a front terminal end 104 which can be releasably snap-fitted into a terminal part 101. The rear cable connection part 103 also comprises an optical fibre cable connection end 105 located towards the opposite end to the front terminal end 104. The optical fibre cable connection end 105 is adapted to receive an optical fibre cable 106. Between the cable connection end 105 and the terminal connection end 104, the body 102 is substantially cylindrical.

The rear cable connection part 103 can be a fully metal part 103*a* or a combination of metal 103*a* and plastic 103*b* portions (FIG. I.2). In the case of a combination of metal and plastic (or non-metal) portions, the plastic portion can be moulded onto a metal tube, the metal tube extending out of the plastic portion and forming a region 105 which can be crimped (FIG. I-2).

The cable connection end 105 of the body 102 incorporates the cable strain relief feature comprising a crimp portion which is used to attach the cable 106 to the body 102 (FIG. I-3). Strain-relieving connections can also, or alternatively, be made at the connector-connector interface (i.e. interface between parts 101 and 103), for example as described in our WO-A-2005/073767, or at the cable-connector interface, or at any interface in between. The crimp can be integrated into the body 102 as shown, or be a separate crimp eyelet (105', FIG. I-11) that can be used to crimp the tensile-resisting strength members of an optical fibre cable onto the body 102.

In one embodiment, an L-shaped slot (107, FIG. I-4) is provided to receive and fold back the strength members 108 of the cable 106 before the body 102 is crimped onto the cable 106. In preferred crimping arrangements, a tongue (109, FIGS. I-5 and I-6) of the crimp eyelet (crimping ring) 105 can be punched into the cable jacket to improve strain relief and prevent torsion of the cable in the connector body.

Optionally, a heat shrink sleeve (110, FIG. I-7 and FIG. I-11, FIG. I-12) can be used to seal the cable 106 to the connector (optical fibre connection device) body 102, and the heat shrink sleeve 110 can improve strain relief and side load capabilities of the cable.

In another embodiment, as shown by arrows 111 in FIGS. I-8 and I-9, the inner design of the body (102) can be such that an optical fibre (112) is guided nicely into the ferrule of the connector body 102.

The illustrated example of the connector body 102 includes integrated securing and orientation formations/features in the form of flat lands (113) on opposed sides of the generally round body 102 to align the body 102 with complementary parts of a optical fibre connection device in use. This design allows standard connector installation procedures to be used without special installation tooling, thus reducing complexity and facilitating termination and connectorization of drop cables, especially (but not exclusively) when using LC connectors.

The lands 113 are terminated by ridges 115 which inhibit movement of the cable connection part 103 in the pulling direction, when the cable connection part is held in mounting retainers 213, 313 (jaws), such as those found in optical fibre connection devices 200, 300 according to the second and third aspects of the invention. The ridges 115 may be in the form of discs (FIG. I-11 and FIG. I-12) formed to extend radially out from the body 102.

The assembly of the optical fibre connector device 103 is illustrated in FIG. I-13. The heatshrink sleeve 110 and the crimp ring 105' are slid over the optical fibre cable 106. The cable 106 is then stripped to expose the optical fibre 178 and Kevlar 179. Epoxy glue is applied to the ferrule 191 using a syringe through the plastic tube 192 to secure the fibre 178 to the ferrule 191. The exposed Kevlar sheaths 179 are then positioned over the exterior of device 103 and the crimp ring 105' inserted are slid over the sheeths 179. The crimp ring 105' is then crimped, after which the heatshrink sleeve 110 installed in a conventional manner.

Another embodiment of the optical fibre connection device 103 (i.e. rear cable connection part) is shown in FIGS. 1-14 to I-20. In these embodiments, the securing and orientation formations 113 comprise stop members positioned at two diametrically opposed positions around the circumference of the connector body 102 (only one formation 113 shown in FIGS. 1-14 to I-20). These are formed in a channel 170 formed around the circumference of the body 102. These are arranged to prevent rotation of the device 103 when held in a complementary shaped retainers in a mounting (not shown).

The rear cable part 103 comprises an aperture 173 through which glue can be poured into the interior of the rear part 103. This aperture 173 is located at the end through which the optical fibre cable 106 is inserted (FIG. I-16). The rear cable part 103 comprises a tube 180 through which the optical fibre 178 of the optical fibre cable 106 can be inserted to project out of the rear part 103. The tube 180 is arranged to keep the optical fibre 178 inserted therein free from any glue inserted through the aperture 173. The tube 180 is sized to house the optical fibre 178 of the optical fibre cable 106, but not the outer sheaths (Kevlar jacket/fibres 179) of the cable 106.

Airholes 175 are provided in the rear part 103 to allow the glue to readily flow within the interior of the rear part 103. The interior of the rear part 103 comprises an abutment face 181 which is arranged to abut with jacket of the optical fibre cable 106 (FIG. I-17, I-18) inserted in the rear part 103. The abutment face 181 acts as a cable stop to resist further inserted of the cable 106 into the rear part 103.

In use, the Kevlar fibres 179 of the optical fibre cable 106 are separated from the optical fibre 178. The optical fibre 178 is then inserted into the tube 180 of the part 103 to keep the optical fibre 178 separated from the fibres 179. The fibres 179 are thus located around the tube 180. Glue is then poured through the aperture 173 to glue the fibres 179 to the rear part 103. As the optical fibre 178 is inserted in the tube 180, it is protected from contamination by the glue.

The assembly of the embodiment of FIG. I-14 is illustrated in FIGS. I-19 and I-20. The ferrule 191 is attached to the optical fibre 178 using the conventional manner described previously in relation to FIG. I-12. However, rather than crimping, hotmelt adhesive is applied through aperture 173 and allowed to cool. The application of adhesive through aperture 173 secures the Kevlar sheaths 179 to the exterior of tube 180 and to the interior of the connector body 102. The fibre 178 is protected from exposure to the hotmelt adhesive by the tube 180.

Let us now consider an optical fibre connection device 200 according to the second aspect of the invention. In this case, the optical fibre connection device 200 is a pulling cap for pulling connectorised optical fibre cables 106 through ducts 250 leading to apparatus in the optical fibre network to which the cables are to be connected. These connectorised optical fibre cables 106 are optical fibre cables which are already connected to an optical fibre connector (for example, such as LC connectors), the connector facilitating connectivity of the optical fibre cable 106 in the optical fibre network.

Pulling cap aspects of the second aspect of the invention are illustrated in FIGS. II-1 to II-5. These relate to a slim cap housing 200 (201a, 201b, 201c) with a pulling eye 102 for use with connectorized drop cables. The cap 200 consists of base shell 201a with seal, lid shell 201b and closing ring clip 201c.

The base shell 201a of the housing has upstanding fixation members (213, FIG. II-3) which engage shoulders/lands on the body 102 (FIG. II-2) of the connection device 103 according to the first aspect of the invention. Thus, the connectorised cable 106 can be pulled through a duct 250 without straining the optical fibre 106 or disrupting the connection parts 101, 103 since the pulling eye 202 and the retention members 213 are on the same shell/carrier). The upstanding retaining members 213 retain the connectorised cable 106 in the base shell 210a. Although the base shell 201a and the lid shell 201b are shown as separated parts in FIGS. II-1 to II-3, they can be held together by a hinge (not shown) which allows the interior of the shells to be readily accessible to allow insertion of the connectorised optical fibre cable therein. For example, the shells 201a, 201b may be held together by a hinge extending parallel to the longitudinal axis of the shells 201a, 201b. In such a case, they would not be considered to be separated parts.

The base shell 201a also comprises a pulling eye 202. The pulling eye 202 is fixed at one end to the base shell 201a, but has another end which is arranged to be rotatable, the rotation axis being the longitudinal axis of the pulling cap 200/optical fibre cable 106 (FIG. II-2, II-3) i.e. rotation about the pulling direction axis. Thus, during pulling of the pulling eye through a duct 250 (FIG. II-5), rotation of the pulling eye does not necessarily result in rotation of the base shell 201a (and thus rotation of the pulling cap 200). In this way, rotation of the connectorised optical fibre cable, held within the pulling cap 200, is inhibited during use of the pulling cap 200. Although the base shell 201a is shown to comprise both the rotatable pulling eye 202 and the retaining members 213, the pulling eye 202 and retaining members 213 can each be located on different shells 201a, 201b. Furthermore, although a closing clip ring 202 is shown, the two shells can be held together to encase the connectorised optical fibre cable 106 by any suitable mechanism. This may include a releasble latch (not shown) which locks the two shells 201a, 201b together.

The retaining members 213 have engagement surfaces which extend in the pulling direction. Thus, when the engagement surfaces are in contact with complementary parts 113 of the exterior of the connector 100, they firmly hold the connector in place across a large surface area in the pulling direction. This facilitates holding of the connector 100 while the pulling cap 200 is pulled through a duct 250.

The shells 201a, 201b can each comprise a cut-out 220 positioned in the respective walls of the shells to define an aperture which snugly fits around a optical fibre cable 106 inserted therein when the cap 200 is assembled with a connectorised optical fibre cable 106. The friction provided by this snug fitting would assist in inhibiting the relative movement of the connectorised optical fibre cable 106 in the cap 200 in the direction of pulling.

When the cap 200 is applied to the cable end 101, 103, as shown in FIG. II-4, the termination is protected against moisture, dirt and mechanical damage, especially if a preferable gel seal is provided between the shell parts 201a, 201b and between the shell entry ports and the cable, the gel compensating for cable diameter variations, since excess gel can be squeezed into the interior cavity of the cap 200.

The cap 200 is reusable and can be supplied independently of the connector/crimp termination assembly 100, and can be completely removed after drawing the cable through a duct 250 during drop cable installation. These functions are provided by two mating shell 201a, 201b which are releasably held together by a removable closing ring clip 201c. The clip 201c has two opposing arms 205, 206, each of which are arranged to releasably engage with co-operating formations 207 on corresponding exterior face of the shells.

The clip 201c also comprises an aperture through which the pulling eye 202 of the base shell 201a can extend when the pulling cap 200 is assembled. The clip 201c can be releasably removed from the shells by using a common tool, such as a screw driver. Use of the screw driver, in an appropriately positioned aperture 215, would allow one or more of the opposing arms 205, 206 to be lifted away from engagement with their corresponding shell 201a, 201b. The cap is dimensioned such that connectorised (terminated) cables 106 can be pulled through a duct 250 of less than 30 mm diameter even when this duct is curved around a radius less than 150 mm (FIG. II-5). The cap 200 thus suits the dimensions of a cable termination using standard available FO connectors and standard ducts 250. Advantageous features of the illustrated cap 200 preferably include its illustrated integral locking mechanism with frontal access; its ability to be installed without using special tools; and the fact that after removal of the protective pulling cap 200, features of the connector 100 which would be specifically required for pulling do not occupy any additional 'volume'.

Let us now consider an optical fibre connection device according to the third aspect of the invention in which the optical fibre connection device is a pivotable mounting. Such aspects are illustrated in FIGS. III-1 to III-5.

The mounting 300 consists of a support baseplate 301 and pivoting part or arm 302 for retaining a connector 100 attached to a drop cable 106. The pivoting part 302 carries a simplex adaptor 304 of known kind enclosing the forward part of a known LC optical connector (101 in FIG. I-1), the release tab 108 of which can be seen projecting from the adaptor 304 in FIG. III-5.

Pivoting the part 302 upwards away from the support table or baseplate 301, for example by pulling the cable 106 upwards, improves access for connecting and disconnecting the connectorised cable to the connector part 103 enclosed in the adaptor 304, because the latter is lifted out of an array of terminations as shown in FIGS. III-2 and III-3. On pivoting the part 302 down, the assembly is preferably locked onto the support table 301 by means of a snap-fit clip or other retaining catch 308.

As best seen in FIG. III-2, the mounting 300 includes upstanding location members/mounting retainers 313 which engage the flat lands 113 on a connectorised optical fibre cable. This provides resistance to both longitudinal and torsional movement of the body relative to the other connector parts within the mounting 300.

The pivoting part 302 of the mounting 300 preferably includes bend control features (e.g. stop arm 310) for controlling the bending of the back side optical fibre leading from the backplane connector, as indicated in FIG. III-3. The preferred pivoting movement could be replaced by a parallel movement.

The adapter 304 is preferably mounted such that it can move (freely) in the direction of the axial pull, preferably as indicated in FIG. III-5, to prevent stresses on the adapter/connector interface. Thus, the adaptor 304 can move along the pivoting part 302.

The pivot arm 302 comprises a rounded end 349 which is held within a depression 350 which is formed (e.g. during the moulding process for the baseplate 301) into the baseplate 301. Extending out of the baseplate 301 over the depression 350 is a curved retaining member 351, which is integrally moulded with the baseplate 301. The curved retaining member 351 is formed to releasably pivotably retain the rounded end 349 of the pivot arm 302.

The various aspects of this invention are particularly, though not exclusively, suitable for allowing or assisting installation of connectorized drop cables to form subscriber optical fibre connections to an optical fibre telecommunications system, preferably within a box or terminal cabinet enclosing a number of such connections.

The Invention claim is:

1. An optical fiber connection assembly, comprising:
a multi-part optical fiber cable connector comprising an optical fiber cable connection end for connection with an optical fiber cable, the fiber optical fiber cable connection end having a body, the body comprising one or more formations and a part connection end, the formations being defined by one or more pairs of substantially flat parallel lands, each pair formed on opposed sides of a generally round body, wherein at least one surface of said formation extends longitudinally; and
a mounting having a retainer profiled to retain the multi-part optical fiber cable connector when the optical fiber cable is connected to the optical fiber cable connection end of the body, the retainer being defined by upstanding retaining members that flank the body and laterally align the optical fiber cable connection end with the mounting, the upstanding retaining members are received in the substantially flat parallel lands, and the upstanding retaining members are viewable from a position above the mounting, the formations adapted to co-operate with the retainer to resist rotational and axial movement of the connector when the connector is assembled with an optical fiber cable and the other parts of the connector and mounted in the mounting.

2. The optical fiber connection assembly of claim 1, comprising at least three plural upstanding retaining members retaining at least two multi-part optical fiber cable connectors.

3. The optical fiber connection assembly of claim 2, wherein an intermediate one of the at least three plural upstanding retaining members is positioned in a substantially flat parallel land on juxtaposed sides of the two multi-part optical fiber cable connectors.

4. The optical fiber connection assembly of claim 3, wherein the mounting comprises a support and an optical fiber connector housing, wherein the housing is arranged to removably house a part of a multi-part optical fiber connector and is pivotably attachable to the support for pivotal movement between first and second positions with respect to the support, the first position being an operating position in which the housing lies on or closely adjacent the support and the second position being an access position in which the optical fiber connector housing is moved angularly away from the support to allow access to the optical fiber connector housing.

5. The optical fiber connection assembly of claim 1, wherein the mounting defines an optical fiber cable pulling cap for pulling connectorized optical fiber cables through ducts leading to an optical fiber apparatus.

6. An optical fiber connection device comprising a multi-part screw threadless optical fiber cable connector, whose parts are releasably interconnectable without requiring relative rotation of the parts of the multi-part connector and having a forward part slidably receivable with a rearward part, wherein the rearward part of the connector is attached to a forward end of a body having a rear connection end for connection with an optical fiber cable, the body comprising:
an optical fiber cable connection end for connection with an optical fiber cable;
a part connection end for connection with another part of the multi-part optical fiber cable connector; and
one or more retaining formations adapted to co-operate with a retaining means in a mounting to be used to retain the connector and the optical fiber cable when connected to the body, the body retaining formations in use co-operating with the mounting retaining means to resist rotational and/or axial movement of the connector when assembled and mounted in the mounting, each formation providing abutment surfaces in plural planes for abutment with plural engagement surfaces on the retainer, the formations being adapted to co-operate with the mounting retainer to resist rotational movement about any axis, and axial movement of the connector when the connector is assembled with an optical fiber cable and the other parts of the connector and mounted in the mounting, and wherein the one or more formations comprise one or more pairs of substantially flat parallel lands, each pair formed on opposed sides of a generally round body, wherein at least one surface of said formation extends longitudinally.

7. A device according to claim 6, wherein the connector is adapted to be retained in said mounting closely side-by-side and substantially parallel with one or more similar or substantially identical connectors.

8. A device according to claim 6, wherein the mounting is adapted to retain the said connector closely side-by-side and substantially parallel with one or more similar or substantially identical connectors.

9. A device according to claim 6, wherein the connector is an LC connector.

10. A device according to claim 6, wherein the connector parts are inter-connectable using a sliding action and incorporate releasable detent means which engage to hold the parts together.

11. A device according to claim 6, wherein the optical fiber cable connection end is arranged to be crimped onto an optical fiber cable.

12. A device according to claim 6, wherein the optical fiber cable connection end comprises one or more tongues arranged to be deflectable to engage with the jacket of an optical fiber cable, upon insertion of an optical fiber cable into the optical fiber cable connection end, in order to improve strain relief and prevent torsion of the optical fiber cable.

13. A device according to claim 12, wherein the one or more tongues comprise tongue pairs arranged to be diametrically opposed.

14. A device according to claim 6, wherein the optical fiber cable connection end comprises a slot arranged to receive optical fiber cable strengthening members.

15. A device according to claim 14, wherein the slot is L shaped.

16. A device according to claim 6, wherein the body is arranged to comprise a taper arranged to guide the optical fiber contained within the optical fiber cable through the body and out towards another part of the multi-part connector.

17. A device according to claim 6, wherein the optical fiber cable connection end comprises a heat shrink sleeve to allow sealable connection to the optical fiber cable by heat shrinking.

18. A device according to claim 6, wherein the part is for a multi-part optical fiber cable connector which is arranged to be, in use, slid into the mounting retainer.

19. A device according to claim 6, wherein the part is for a multi-part optical fiber cable connector which is arranged to be, in use, snap-fitted into the mounting retainer.

20. A device according to claim 6, wherein the optical fiber cable connection end is made from a crimpable metal and the body is made from a plastic.

21. A device according to claim 6, including pulling formations engagable by an optical fiber cable pulling cap for pulling connectorized optical fiber cables through ducts leading to an optical fiber apparatus.

22. A device according to claim 21, terminating an optical cable end with the said pulling cap fitted thereover, wherein the pulling cap is shaped and fitted to protect the termination against moisture, dirt, and mechanical damage.

23. An optical fiber connection device according to claim 6, mounted on an optical fiber connector mounting, the mounting comprising a support and an optical fiber connector housing, wherein the housing is arranged to removably house a part of a multi-part optical fiber connector and is pivotably attachable to the support for pivotal movement between first and second positions with respect to the support, the first position being an operating position in which the housing lies on or closely adjacent the support and the second position being an access position in which the optical fiber connector housing is moved angularly away from the support to allow access to the optical fiber connector housing.

24. A device according to claim 23, wherein the optical fiber connector housing is mounted on a pivot arm, the housing being arranged to be moveable along the pivot arm at least in the said first position.

25. A device according to claim 23, wherein the mounting is arranged to provide a controlled second access position of the housing, the controlled second access position providing a maximum movement position of the housing away from the first position to control bending of an optical fiber connected to the end of the housing nearest the pivot point.

26. A device according to claim 25, wherein the controlled second access position is provided by a stop arm which is arranged to extend from the pivot point, and be located on a pivot arm comprising the housing.

27. A multi-part optical fiber cable connector comprising the device according to claim 6.

* * * * *